(12) United States Patent
Hori et al.

(10) Patent No.: US 10,618,692 B2
(45) Date of Patent: Apr. 14, 2020

(54) STACKABLE CASES

(71) Applicant: MAKITA CORPORATION, Anjo-shi (JP)

(72) Inventors: Shiro Hori, Anjo (JP); Atsushi Hori, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 279 days.

(21) Appl. No.: 15/446,439

(22) Filed: Mar. 1, 2017

(65) Prior Publication Data

US 2017/0259956 A1   Sep. 14, 2017

(30) Foreign Application Priority Data

Mar. 9, 2016  (JP) ................. 2016-046025
Aug. 5, 2016  (JP) ................. 2016-154532

(51) Int. Cl.
*B65D 21/02*  (2006.01)
*H02J 7/00*  (2006.01)
(Continued)

(52) U.S. Cl.
CPC ........ *B65D 21/0217* (2013.01); *A45C 7/0045* (2013.01); *A45C 11/20* (2013.01); *A45C 13/02* (2013.01); *A45F 3/14* (2013.01); *B25H 3/006* (2013.01); *B25H 3/02* (2013.01); *B65D 25/04* (2013.01); *B65D 45/16* (2013.01); *B65D 81/3813* (2013.01); *F25B 21/04* (2013.01);
(Continued)

(58) Field of Classification Search
CPC .. F25D 3/08; F21B 21/02; F21B 21/04; F21B 23/028; F21B 11/00; F21B 2321/0212; F21B 2321/023; F21B 17/06; F21B 2400/12; B65D 21/0217; B65D 25/04; B65D 81/3813
See application file for complete search history.

(56) References Cited

U.S. PATENT DOCUMENTS 5,398,510 A * 3/1995 Gilley ................ F25B 21/02
                                                  62/3.6
5,699,925 A * 12/1997 Petruzzi ............ B65D 21/0204
                                                  206/508
(Continued)

FOREIGN PATENT DOCUMENTS

CN    2815940 Y    9/2006
CN  101468532 A    7/2009
(Continued)

OTHER PUBLICATIONS

DE 202013003740 translation.*
(Continued)

*Primary Examiner* — Elizabeth J Martin
(74) *Attorney, Agent, or Firm* — J-TEK Law PLLC; Jeffrey D. Tekanic; Scott T. Wakeman

(57) ABSTRACT

A stackable case includes a cooling and/or heating device, such as a Peltier element, so that the stackable case can be used as a cooler and/or warmer for storing beverages, food, etc. A power source device, in which a plurality of battery packs is housed, supplies power to the Peltier element and one or more fans. The power supply device has latches for detachably joining or linking it to the stackable case in a stacked manner.

17 Claims, 28 Drawing Sheets

(51) Int. Cl.
*F25D 11/00* (2006.01)
*B25H 3/02* (2006.01)
*A45C 13/02* (2006.01)
*A45C 7/00* (2006.01)
*A45C 11/20* (2006.01)
*A45F 3/14* (2006.01)
*B25H 3/00* (2006.01)
*B65D 25/04* (2006.01)
*B65D 45/16* (2006.01)
*B65D 81/38* (2006.01)
*F25B 21/04* (2006.01)
*F25D 23/02* (2006.01)
*F25D 17/06* (2006.01)

(52) U.S. Cl.
CPC ............ *F25D 11/00* (2013.01); *F25D 23/028* (2013.01); *H02J 7/0013* (2013.01); *H02J 7/0027* (2013.01); *H02J 7/0044* (2013.01); *A45F 2003/142* (2013.01); *F25B 2321/023* (2013.01); *F25B 2321/0212* (2013.01); *F25D 17/06* (2013.01); *F25D 2400/12* (2013.01)

(56) References Cited

U.S. PATENT DOCUMENTS

| | | | |
|---|---|---|---|
| 5,860,281 A * | 1/1999 | Coffee | A45C 11/20 62/3.62 |
| 6,260,360 B1 | 7/2001 | Wheeler | |
| 6,349,845 B1 * | 2/2002 | Duncan | B65D 25/34 150/154 |
| 9,248,566 B2 | 2/2016 | Horiyama et al. | |
| RE47,022 E * | 9/2018 | Sosnovsky | B25H 3/02 |
| 2004/0070369 A1 * | 4/2004 | Sakakibara | B25F 5/00 320/128 |
| 2005/0274726 A1 * | 12/2005 | Boggs | A47C 1/14 220/592.03 |
| 2007/0193999 A1 * | 8/2007 | Peterson | B25H 3/02 219/386 |
| 2008/0178629 A1 * | 7/2008 | Meether | F25D 3/08 62/451 |
| 2009/0277187 A1 * | 11/2009 | McGann | F25B 21/02 62/3.6 |
| 2010/0221487 A1 | 9/2010 | Leng | |
| 2011/0155613 A1 * | 6/2011 | Koenig | B65D 21/0223 206/503 |
| 2013/0187461 A1 | 7/2013 | Goto et al. | |
| 2014/0013789 A1 | 1/2014 | Conrad et al. | |
| 2014/0183075 A1 | 7/2014 | Horiyama et al. | |
| 2014/0262861 A1 | 9/2014 | Crowe et al. | |
| 2014/0327396 A1 * | 11/2014 | Rejman | H01M 10/44 320/108 |
| 2015/0145476 A1 | 5/2015 | Toya | |
| 2015/0150231 A1 * | 6/2015 | Norman | A01K 97/08 43/17.5 |
| 2015/0351286 A1 * | 12/2015 | Sakamoto | F25B 1/00 62/498 |
| 2017/0098949 A1 | 4/2017 | Goto et al. | |

FOREIGN PATENT DOCUMENTS

| | | |
|---|---|---|
| CN | 202664800 U | 1/2013 |
| CN | 103153140 A | 6/2013 |
| CN | 204433277 U | 7/2015 |
| CN | 204845022 U | 12/2015 |
| DE | 20 2013 003 740 U1 | 6/2013 |
| JP | S53102650 U | 8/1978 |
| JP | S5520063 U | 2/1980 |
| JP | S5526388 B2 | 7/1980 |
| JP | H05264153 A | 10/1993 |
| JP | H0593242 U | 12/1993 |
| JP | H0736670 U | 7/1995 |
| JP | H08226734 A | 9/1996 |
| JP | H09138047 A | 5/1997 |
| JP | 2000007056 A | 1/2000 |
| JP | 2001221553 A | 8/2001 |
| JP | 2001524657 A | 12/2001 |
| JP | 2002282136 A | 10/2002 |
| JP | 2004238035 A | 8/2004 |
| JP | 2007139328 A | 6/2007 |
| JP | 2008020120 A | 1/2008 |
| JP | 2009196231 A | 9/2009 |
| JP | 2012080990 A | 4/2012 |
| JP | 2012193874 A | 10/2012 |
| JP | 2013-226621 A | 11/2013 |
| JP | 2014168379 A | 9/2014 |
| JP | 2015131081 A | 7/2015 |

OTHER PUBLICATIONS

Office Action from the Japanese Patent Office dated Aug. 29, 2017 in related Japanese application No. 2017-002409, and translation thereof.
Office Action from the Japanese Patent Office dispatched Dec. 12, 2017 in related Japanese application No. 2017-002409, and machine translation thereof.
Office Action from the Japanese Patent Office dispatched Jan. 8, 2019 in counterpart Japanese application No. 2016-154532, and machine translation thereof.
Office Action from the Japanese Patent Office dated Jan. 8, 2019 in related Japanese application No. 2016-154532, and machine translation thereof.
Office Action from the Japanese Patent Office dated Apr. 18, 2017 in related Japanese application No. 2017-002409, and translation thereof.
Office Action and Search Report from the Chinese Patent Office dated Apr. 22, 2019 in counterpart Chinese application No. 201710131365.1 and translation thereof.
Office Action and Search Report from the Chinese Patent Office dated Dec. 16, 2019 in counterpart Chinese application No. 201710131365.1 and translation thereof.
Household Refrigerator Overhaul Technology, HU Pengcheng, Jindun Press, published Jun. 30, 1999.

* cited by examiner

STACKABLE CASES

CROSS-REFERENCE

This application claims priority to Japanese patent application serial number 2016-46025, filed on Mar. 9, 2016, and to Japanese patent application serial number 2016-154532, filed on Aug. 5, 2016, the contents of which are incorporated herein by reference in their entirety.

TECHNICAL FIELD

The present invention generally relates to stackable cases that enable a plurality of cases to be linked or coupled together and carried together in a stacked manner. In a non-limiting example, one of the cases may be, e.g., a cooler/warmer, one of the cases may be designed, e.g., to house/hold an electric power tool, such as a driver drill, impact wrench, portable saw, etc., and one of the cases may be designed, e.g., to hold a power supply device containing and/or utilizing one or more power tool battery packs.

BACKGROUND ART

Japanese Laid-Open Patent Publication No. 2013-226621 discloses a design for a stackable case that is configured to link or couple an upper case to a lower case via interlocking latches that also serve to lock a lid of the case in a closed position. The lid for the upper case is locked in its closed position by the interlocking latches and the lid for the lower case is locked in its closed position by the upper case being stacked on and linked to the lower case. When the engagement of the latches is released, each of the upper and lower cases can be used as a separate case and each lid can be locked with its own latches. This design enables two or more of the stacked cases to be carried in a linked or joined manner by using the interlocking latches as connectors for both locking the lids in their closed state and for joining the cases to each other. The plurality of stacked, joined cases can be easily and conveniently carried with one or more electric power tools and/or its/their accessories being stored separately in a plurality of cases.

SUMMARY

Such a known stackable, linkable case is limited to storing only electric power tools and/or accessories thereof. It is therefore an object of the present teachings to expand the applicability and/or utility of such a stackable case.

In one exemplary embodiment of the present disclosure, a stackable, linkable case (also known as an "interlocking case") is configured to be fixed (joined, linked, coupled, connected, interlocked) to another case, e.g., in which an electric power tool is housed. The stackable, linkable case comprises a heat insulation material, and is configured to house/hold one or more objects to be stored and maintained in a cool state or in a warm state.

According to such an embodiment, object(s) such as, for example, beverages, food, etc. can be stored and maintained in a cool state or in a warm state and conveniently carried together, e.g., with a case holding an electric power tool. In this aspect of the present teachings, the convenience of this type of cases can be improved and also types of the objects that can be stored may be extended (expanded).

In another exemplary embodiment of the disclosure, the case includes a case main body and a lid for opening and closing the case main body. Furthermore, the lid is configured to include the heat insulation material disposed between an outer panel and an inner panel, and the inner panel is fixed to the outer panel by one or more fixing members.

According to such an embodiment, deformation and/or displacement of the heat insulation material can be prevented by fixing the outer panel to the inner panel of the lid using the fixing member(s). Thus, the heat insulation material can maintain a high heat insulation effect (value) over a longer period of time.

In another exemplary embodiment of the disclosure, the case includes a case main body and a lid for opening and closing the case main body. The case main body contains heat insulation material disposed between an outer panel and an inner panel of the case main body. Furthermore, one or more ribs is (are) disposed between the outer panel and the inner panel such that the rib(s) contact(s) both the outer panel and the inner panel.

According to such an embodiment, since the rib(s) is (are) disposed between the outer panel and the inner panel such that the rib(s) contact(s) both the outer panel and the inner panel, a suitable space for holding (contain) the heat insulation material can be reliably and durably provided (secured) between the outer panel and the inner panel. Because of this arrangement, deformation and/or displacement of the heat insulation material can be reliably prevented. Thus, the heat insulation material can maintain a high heat insulation effect (value) over a longer period of time.

In another exemplary embodiment of the disclosure, a case set includes a first case in which an electric power tool is housed, and a second case in which a bottle for storing beverage is housed. The second case is configured to be fixed (joined, linked, coupled, connected, interlocked) to the first case. Furthermore, at least one part on the first case differs in color from other parts of the first case, and at least one part on the second case differs in color from other parts of the second case.

According to such an embodiment, by coupling the first case to the second case in a stacked manner so that the first and second cases can be carried together, e.g., by grasping a carrying handle, ease of portability is improved. For example, by storing a plurality of beverage cans and/or bottles in the second case, the user can drink cool or warm beverage(s) at a work site where the electric power tool is used. In this regard, the utility of such a case can be extended and its convenience can be improved.

In another exemplary embodiment of the disclosure, an indication is provided on an outer surface of the second case to show that a bottle is stored in the second case.

According to such an embodiment, a user can conveniently use the case. Letters, photos and/or patterns may be used for indicating that the bottles can be stored.

In another exemplary embodiment of the disclosure, a case comprises a heat insulation material such that the case is configured to store and maintain an object in a cool state or in a warm state. In the alternative, an electric power tool may be housed in the case.

According to such embodiment, the utility of such a case can be extended by storing the electric power tool in the case instead of food and/or beverages. Thus, the user can conveniently use such a multi-purpose case.

In another exemplary embodiment of the disclosure, a stackable case comprises one or more latches (interlocking latch(es)) configured to couple, join, attach the stackable case to a tool case, in which an electric power tool is housed. The latch(es) may be configured to connect the tool case, e.g., to an upper side of the stackable case in a stacked manner. Furthermore, the stackable case includes means for cooling and/or heating the interior (storage compartment) of the stackable case.

According to such an embodiment, the tool case, in which an electric power tool and/or its accessories are housed (stored), can be conveniently carried together with a stackable case having means for cooling and/or heating the interior thereof while the tool case is coupled, joined, attached to the stackable case in a stacked manner. Such a stackable case can store and maintain, for example, food and/or beverages in a cool state or in a warm state. Therefore, according to this embodiment, food, beverages, etc. can be carried in a cool state or in a warm state to a work site more conveniently, where electric power tools and accessories are used. In this regard, the utility of the stackable case can be extended by configuring the stackable case, for example, as a cooler (a cooler box) or as a warmer.

In another exemplary embodiment of the disclosure, a Peltier element is used for cooling or heating the interior (storage compartment) of the stackable case.

According to such an embodiment, one or more Peltier elements may be used as a representative means for cooling and/or heating the interior (storage compartment) of the case. A Peltier element is a thermally conductive element (thermoelectric device or thermoelectric cooler) that operates according to the Peltier effect. A typical Peltier element is constructed by forming an array of alternating n-type and p-type semiconductors having complementary Peltier coefficients and then soldering the array of elements between two thermally conductive (ceramic or metal) plates, such that the alternating semiconductors are connected electrically in series and thermally in parallel. Cooling occurs when a current passes through one or more pairs of semiconductor elements from the n-type to the p-type, which causes a decrease in temperature at the junction ("cold side") and results in the absorption of heat from the environment. The heat is carried along the semiconductor elements by electron transport and is released on the opposite ("hot") side as the electrons move from a high- to low-energy state. Peltier elements typically have a rectangular flat plate shape and are commercially available in various sizes. Instead of the above-described Peltier element, a vapor-compression refrigeration system or resistive heating wires alternatively can be used as the means for cooling and/or heating the interior of the stackable case.

In another exemplary embodiment of the disclosure, one or more rechargeable battery packs that is (are) used as the power source for the electric power tool is (are) also used as the power source for supplying power to the Peltier element.

According to such an embodiment, a battery pack designed to be used with an electric power tool (i.e. a cordless power tool), which can be carried together with the case in a stacked manner, can be used as the power source for the Peltier element. In other words, the battery pack can be used for (shared by) both the electric power tool and the Peltier element. By providing a plurality of battery packs, the electric power tool and the Peltier element can be simultaneously operated. Further, since the battery pack (DC power source) can be used as the power source for the Peltier element, the cooling function of the stackable case can be used, e.g., outdoors, at work sites, etc. where no outlet for a commercial AC power source is available. In addition, the battery pack is preferably rechargeable, such as a lithium ion battery pack, and thus can be used repeatedly by being recharged. Thus, the present embodiment provides a particularly convenient, portable cooler/warmer.

In another exemplary embodiment of the disclosure, at least one heat radiation fin and at least one circulating fan are disposed in the proximity of the Peltier element to remove or transfer heat generated by the Peltier element.

According to such an embodiment, the heat radiation fin(s) and the fan(s) improve the heat transfer from the heat generating side (plate) of the Peltier element, thereby improving the cooling efficiency and/or the heating efficiency of the Peltier element. In the alternative, instead of a configuration in which one or more dedicated heat radiation fins are used, the stackable case itself may be designed to serve as heat radiation fins to which the Peltier element is attached.

In another exemplary embodiment of the disclosure, the stackable case includes the Peltier element, the battery pack(s), the heat radiation fin(s), and the circulating fan(s) in the interior thereof to form one unit.

According to such an embodiment, since the Peltier element, the battery pack(s), the heat radiation fin(s), and the circulating fan(s) can be handled as one unit (cooling unit), the cooling unit can be additionally attached (attached afterward) to and/or removed from another stacked case. Thus, the cooling unit can be easily handled.

In another exemplary embodiment of the disclosure, the stackable case is configured to be coupled in a stacked manner to a power supply device, in which a plurality of rechargeable battery packs designed for use with the electric power tool are housed, and the plurality of rechargeable battery packs are electrically connected for supplying power to the Peltier element.

According to such an embodiment, the power supply case is configured to supply a large amount of electric power and can be carried in addition to or alternative to the tool case in a stacked manner. In this respect, the handling properties of the Peltier element and the power source can be further improved.

In another exemplary embodiment of the disclosure, a stackable device is configured to be coupled to a stackable case in a stacked manner. The stackable device comprises means for cooling the interior (storage compartment) of the stackable case and/or means for heating the interior of the stackable case. The stackable device further comprises a first stack-coupling means for coupling the stackable device to a tool case, in which an electric power tool is housed, in a stacked manner. Furthermore, the stackable device is configured to be coupled to the stackable case in the stacked manner by use of a second stack-coupling means.

According to such an embodiment, the stackable case and the stackable device can be coupled to each other and can be carried in a stacked manner. The stackable case can be separated from the stackable device to be used independently as a storage case for one or more objects. On the other hand, when the stackable device is coupled to another stackable case, the interior of the other stackable case can be kept cool and/or warm. If the stackable device includes means for both heating and cooling the interior of the stackable case in one unit, the handling properties as well as versatility may be improved as compared to other stackable cases.

In another exemplary embodiment of the disclosure, a Peltier element may be provided in the stackable device to generate the cooling or heating that will be supplied (transferred or transmitted) to the interior of the stackable case.

According to such an embodiment, the cooling or heating is generated within the stackable device, e.g., by changing the direction (polarity) of the current flow to the Peltier element. However, instead of the Peltier element, a vapor-compression refrigeration system can be used to generate the heating or cooling to be supplied to cool the interior of the stackable case. Instead of the Peltier element or the vapor-compression refrigeration system, resistive heating wires can be used if the stackable device is designed to be used only as a warmer.

In another exemplary embodiment of the disclosure, a rechargeable battery pack that is designed to be used as the power source for an electric power tool is utilized as the power source for the Peltier element disposed in the stackable device.

According to such an embodiment, the stackable device can be operated by cost-effectively using the same battery packs for the electric power tool.

In another exemplary embodiment of the disclosure, the second stack-coupling means includes one or more latches (interlockable latch(es)) configured to engage with corresponding structures (e.g., protrusions) on the stackable case in order to link, join, couple the stackable device to the stackable case in the stacked manner.

According to such an embodiment, the engagement of the latch(es) couples the stackable case to the stackable device in the stacked manner. When the engagement of the latch(es) is released, the stackable case can be separated from the stackable device. Thus, the stackable case and the stackable device may be coupled or separated by engaging or releasing the latch(es), respectively. In this regard, the handling properties of the stackable case and the stackable device can be improved.

In another exemplary embodiment of the disclosure, the stackable case comprises the first stack-coupling means to couple it to the tool case, in which an electric power tool is housed, in a stacked manner. Furthermore, the stackable case is configured to be coupled, in the stacked manner by use of the second stack-coupling means, to a stackable device, e.g., as described above, having means for cooling and/or heating the interior of the stackable case.

According to such an embodiment, the tool case may be coupled to the stackable case so that the two cases can be carried together in a stacked, linked manner. In addition to or in the alternative to the tool case, the stackable device may be coupled to the stackable case in a stacked manner. The interior of the stackable case may be kept warm or cool by coupling it to the stackable device in a stacked manner. Such a stackable case can be used as a cooler, in which beverages, etc. may be stored and maintained in a cooled state, by generating cooling in the stackable device and supplying the cooling to the interior (storage compartment) of the stackable case. Furthermore, such a stackable case can be used as a warmer, in which beverages, etc. may be stored and maintained in a warm state, by generating heat in the stackable device and supplying the heat to the interior (storage compartment) of the stackable case.

DETAILED DESCRIPTION

The detailed description set forth below, when considered with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, these specific details refer to well-known structures, components and/or devices that are shown in block diagram form in order to avoid obscuring significant aspects of the exemplary embodiments presented herein.

Figure 1:
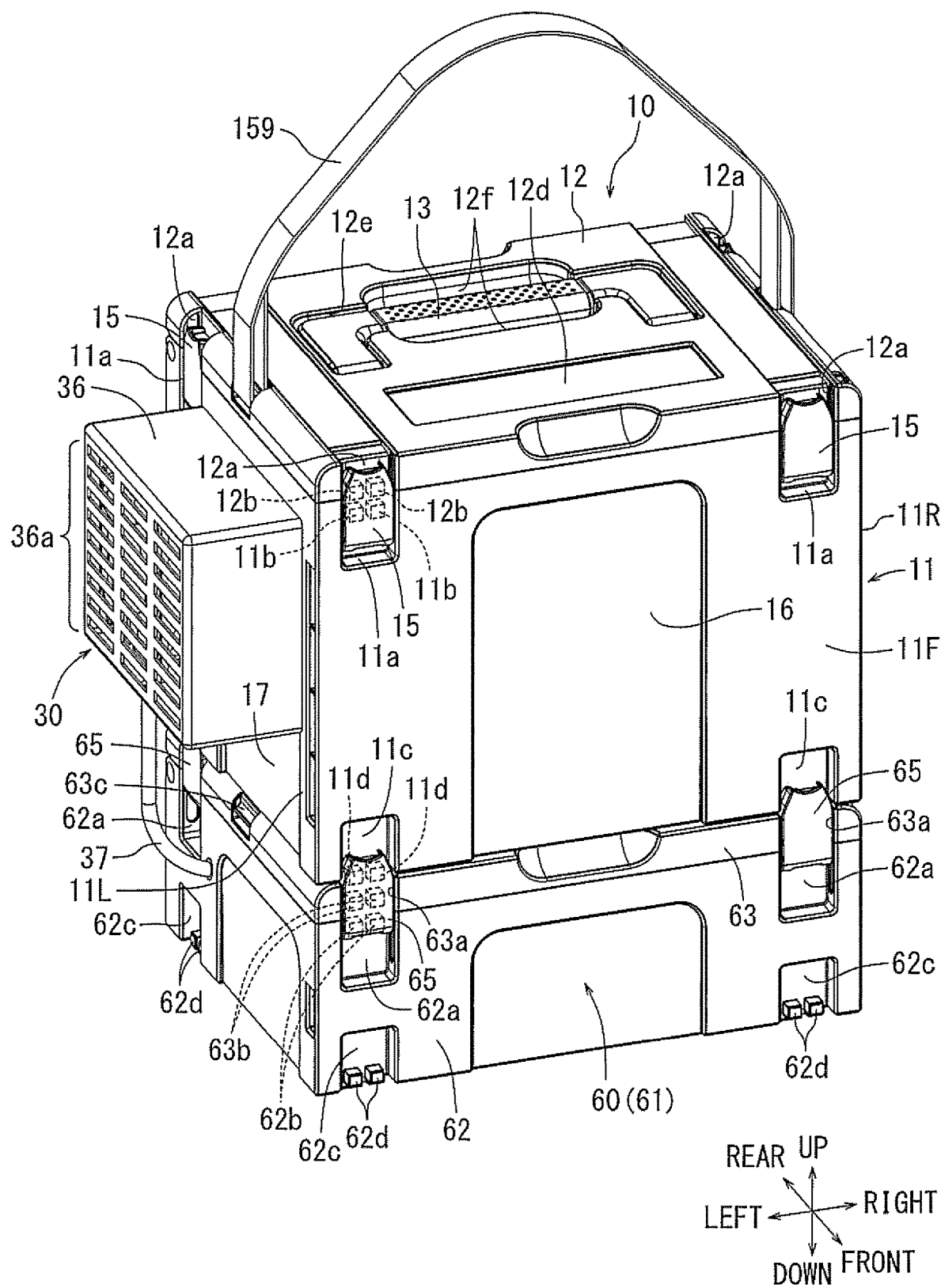
FIG. 1 is a perspective view of a stackable case according to an exemplary embodiment (first embodiment) of the present disclosure with a power supply case placed on a lower side in a stacked manner.
Figure 2:
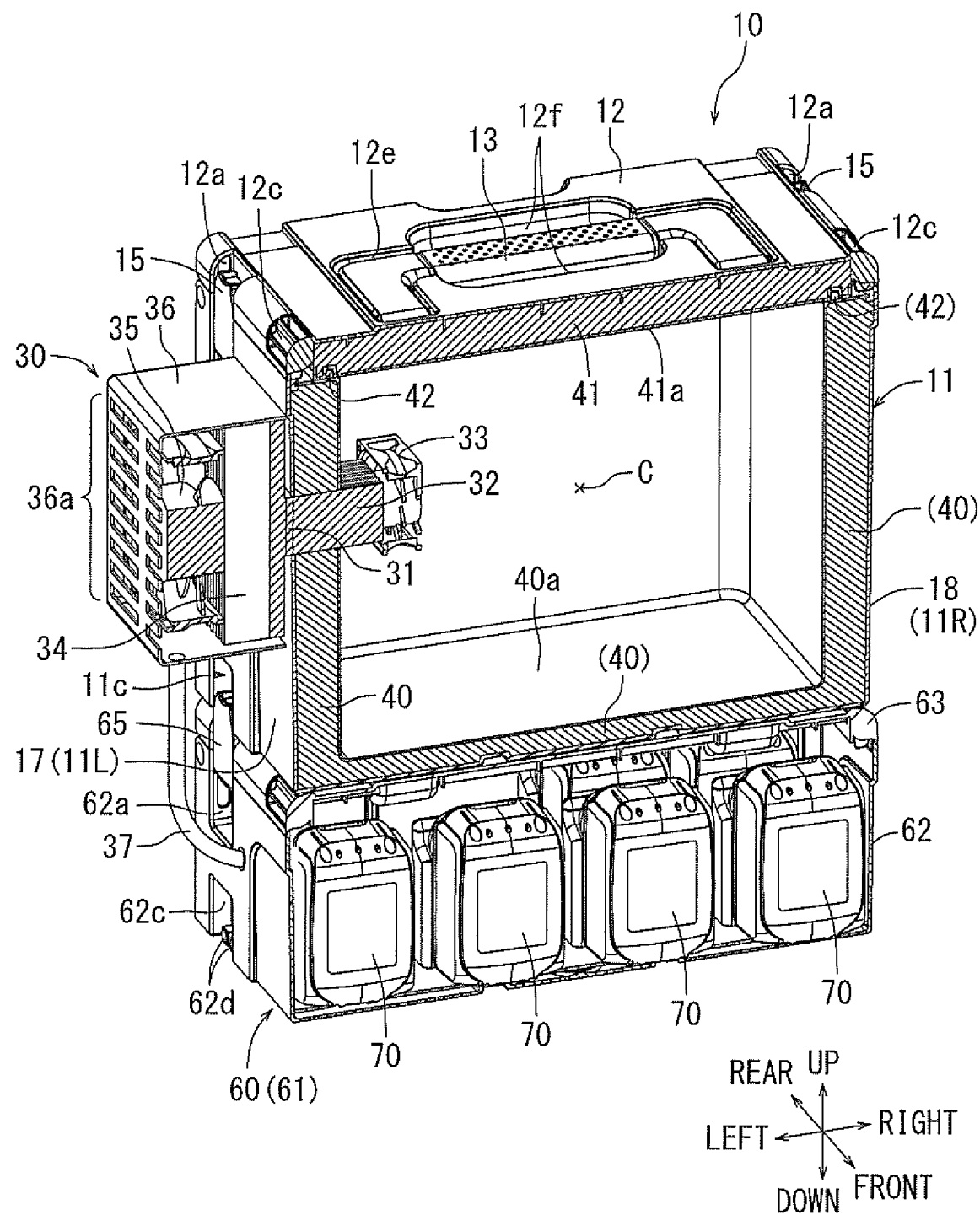
FIG. 2 is a perspective view of the stackable case according to the first embodiment in a vertical cross section.

Representative, non-limiting embodiments according to the present disclosure will now be described with reference to the FIGS. 1 to 32. A stackable case 10 and a power supply device 60 according to a first embodiment are shown in FIGS. 1 to 10. FIGS. 1 and 2 show the power supply device 60 coupled to a lower side of the stackable case 10 in a stacked manner, thereby forming a case set. The power supply device 60 will be further described below. The stackable case 10 according to the first embodiment, which is stacked on an upper surface side of the power supply device 60, may include a case main body 11 with an upper portion that opens upwardly and a lid 12 for opening and closing the opening. The case main body 11 and the lid 12 each may be made of a molded resin or plastic (polymer) material, and the stackable case 10 may be designed as a so-called hard case (plastic case).

A stepped portion (recess) 16 may be formed in a front surface 11F of the case main body 11 for indicating identification information regarding one or more objects (e.g., food, beverages, etc.) to be stored in the stackable case 10. The stepped portion 16 may be formed in a center in a lateral direction covering approximately one half of the total area of the front surface 11F. The stepped portion 16 may be formed to be 2 mm to 3 mm lower (deeper) than the surrounding area of the front surface 11F. The stepped portion 16 may be opened toward a lower end portion of the front surface 11F. A label for indicating the identification information regarding the object(s) to be stored in the stackable case 10 may be attached to the stepped portion 16. Instead of a label, the identification information may be directly printed (marked) on the stepped portion 16. The identification information may be or may include, e.g., an indication that the stackable case 10 is a cooler (or cooling box), which can store, for example, food and/or beverages, e.g., in cans, glass bottles or PET bottles, while keeping them cool or warm. The label to be attached may include, for example, illustrations or photos with an image in white or blue as a base color such that a user or a purchaser can recognize at a glance that the stackable case 10 is a cooler (or cooler and warmer). For example, the number of storable bottles or cans that are storable therein can be indicated on the attached label for the convenience of the user. Stepped portions 16, 17, 18 providing such identification information may be formed in one or more of the front surface 11F, and the left and right side surfaces 11L, 11R, respectively, as well as in a rear surface (not shown in the figures).

The lid 12 may be rotatably (pivotably) coupled to a rear part of the case main body 11 via one or more hinges so as to be pivotable upward in the vertical direction. A carrying handle 13 may be provided at (on) an upper surface of the lid 12. The carrying handle 13 may be supported by the lid 12 so as to be pivotable upward. As shown in FIG. 1, a handle storage recess 12e may be provided (defined) in the upper surface of the lid 12 for storing the carrying handle 13. The carrying handle 13 can be stored in a position such that it does not extend beyond (upward of) the upper surface of the lid 12 when the carrying handle 13 is tilted (folded) down toward the rear side so as store it within the interior of the handle storage recess 12e. In the middle of the handle storage recess 12e, front and rear relief recesses 12f may be formed that allow the user to insert his or her fingertips. The user can easily tilt the carrying handle 13 up toward the front side by inserting one or more fingertips into the front and rear relief recesses 12f and firmly grasping the handle 13.

Belt attachment pins (belt hanging parts or anchors) 12c may be provided at (on) the left and right sides of the lid 12. The user can carry the stackable case 10 independently or in a stacked manner on his or her shoulder by using a shoulder belt 159 attached to the left and right belt attachment pins 12c. A logo display surface 12d may be defined on the upper surface closer to the front, e.g., for displaying a logo or other mark(s) of the manufacturer of the stackable case 10. The logo display surface 12d may be recessed to have a stepped shape, which is formed about 2 mm to 3 mm lower (deeper) than the surrounding surface. A label showing, for example, a logo can be attached via a label or directly printed (marked) on the logo display surface 12d. In the alternative, letters or patterns can be molded in the logo display surface 12d.

Latches (e.g., interlocking latches) 15 may be respectively provided at two upper locations on the front surface 11F of the case main body 11 and at one upper location on a rear side of each of the left and right lateral surfaces, such that four latches 15 are provided in total. These four latches 15 serve to lock the lid 12 in its closed position as shown in FIG. 1. The four latches 15 may be respectively disposed on the left and right sides of the front surface and on the left and right sides closer to the rear side. The latches 15 may be molded resin (polymer) parts having a substantially flat plate shape on the exterior surface and may be molded by using a white resin as the material to convey the impression that the stackable case 10 is a cooler. A logo or other mark(s) of the manufacturer of the stackable case 10 may be displayed on the latches 15. The lid 12 may be locked in its closed position when each latch 15 is tilted/pressed into its locked position. The four latches 15 may have the same lock mechanism. In the latched position where the lid 12 is locked in its closed position as shown in FIG. 1, each of the four latches 15 may straddle a recess 11a provided on (defined in) the case main body 11 and a recess 12a provided on (defined in) the lid 12. Each latch 15 may be slidably supported so as to be displaceable vertically within the recess 11a on the side of the case main body 11, and may be tiltable in the front-rear direction or in the left-right direction. More specifically, the two latches 15 in the front side can be vertically displaced (slid) while being tilted in the forward-rearward direction with the lower portion thereof serving as its fulcrum. The left and right latches 15 can be vertically displaced (slid) while being tilted in the leftward-rightward direction with the lower portion thereof serving as its fulcrum. FIG. 1 shows the four latches 15 displaced (slid) to their downward-most positions.

As shown in FIG. 1 with dotted lines, two engagement protrusions 11b may be arranged side by side in each of the recesses 11a on the upper side of the case main body 11. Similarly, two engagement protrusions 12b may be arranged side by side in each of the recesses 12a on the side of the lid 12. The two engagement protrusions 11b on the side of the case main body 11 and the two engagement protrusions 12b on the side of the lid 12 each may be formed in a block (cube) shape with the same size, and may be disposed at the same intervals (spacing) in the lateral (left-right or front-rear) direction.

Though it is not shown in the drawings, an interior surface of each of the latches 15 may have two pairs of left and right engagement recesses that are respectively disposed in two vertical rows. These engagement recesses are defined on the inward surface of the latches 15 that faces the engagement protrusions 11b, 12b. The four engagement recesses in each latch 15 are arranged so as to correspond to the four protrusions 11b, 12b on the case main body 11 and the lid 12 when the latch 15 is disposed in its downward-most and locked position. Furthermore, the four engagement recesses are configured to elastically engage (squeeze) the corresponding engagement protrusions 11b, 12b, to thereby detachably hold the latch 15 on the engagement protrusions 11b, 12b. Therefore, when the latches 15 are each slid downward in the respective recesses 11a and are tilted (pressed) toward the lock side with the lid 12 closed, the two engagement protrusions 11b on the side of the case main body 11 elastically fit into the corresponding two lower engagement recesses, while the engagement protrusions 12b on the side of the lid 12 also elastically fit into the two upper engagement recesses on the latch 15. In this way, all of the latches 15 may be maintained in their locked positions such that the lid 12 is locked in its closed state. If the latches 15 are then tilted (pulled) toward an unlock side (i.e. away from the case main body 11 and the lid 12), they will be released from the engagement protrusions 11b on the case main body 11 and the engagement protrusions 12b on the lid 12 so that the lid 12 may then be opened upwardly.

In order to link or connect the lower side of the case main body 11, e.g., to another stackable case (such as the power supply device 60, a tool case 20, etc.), four connection recesses 11c may be respectively defined at (on, in) the lower portion of the case main body 11 below the four recesses 11a. Two connection protrusions 11d may be laterally disposed side by side on (in) the bottom portion of each of the connection recesses 11c. The connection protrusions 11d may be formed in the same block shape as the engagement protrusions 11b and may be disposed at the same intervals in the lateral direction. Therefore, in the same manner as the latches 15 and engagement protrusions 11b, 12b described above, the connection protrusions 11d respectively contained in the four lower connection recesses 11c and latches 65 (described below) may serve to connect (link) the stackable case 10, e.g., to the power supply device 60, so that they may be carried (handled) in an integrally stacked (joined) manner when the stackable case 10 is placed (stacked) on the power supply device 60 (power supply case 61).

In an alternative to the arrangement shown in FIG. 1, the power supply device 60 may instead be placed on the upper surface side of the stackable case 10 and joined (latched) thereto by pressing the respective latches 15 onto the corresponding engagement protrusions 62d located on the bottom the power supply device 60, as will be further described below.

Figure 10:
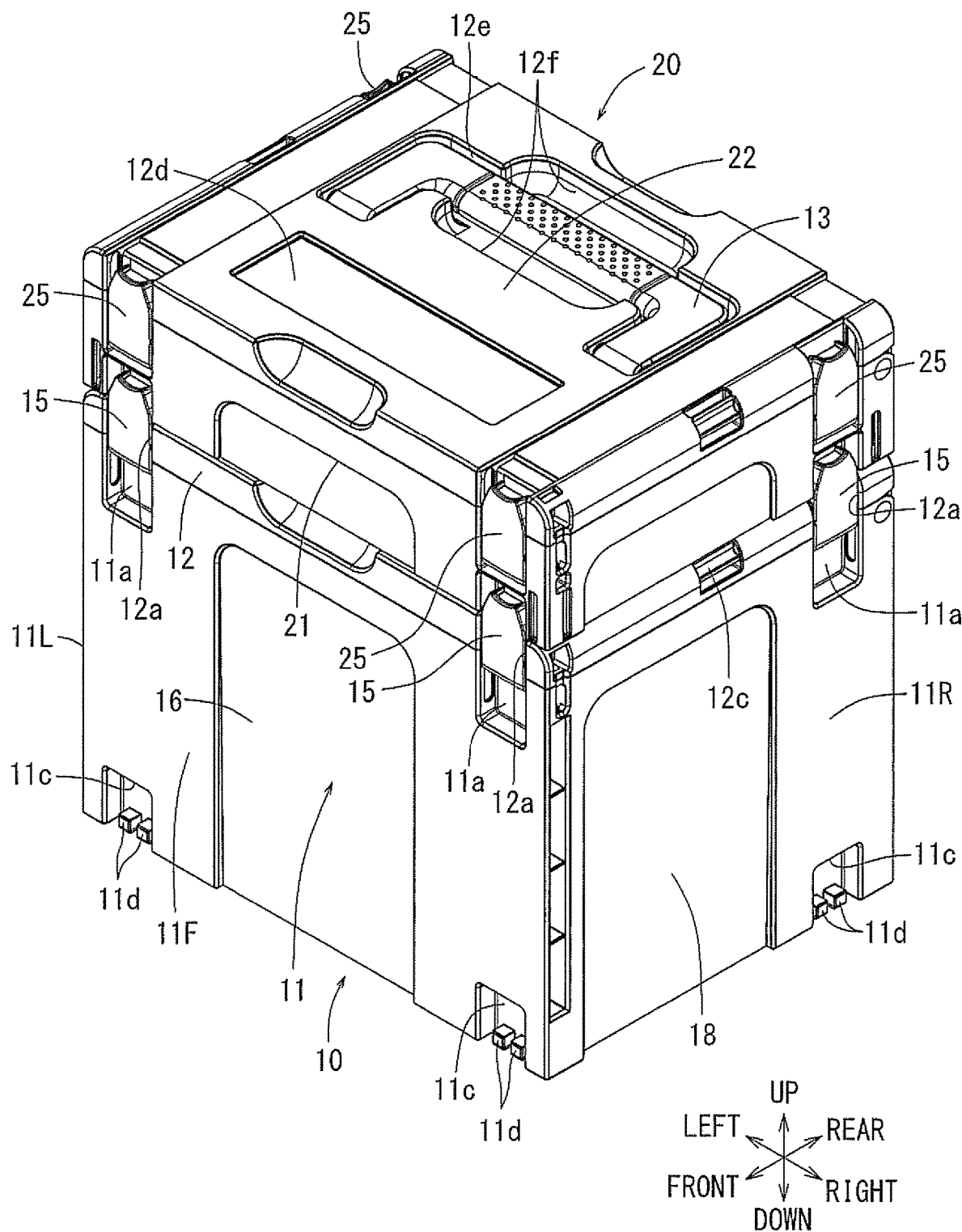
FIG. 10 is a perspective view of the stackable case with a tool case located on an upper side in a stacked manner.

In another alternative, instead of placing (stacking) the power supply device 60 on top of the stackable case 10, a tool case 20 could be placed on the upper surface side of the stackable case 10 so as to be linked (latched) thereto as shown in FIG. 10. In such a linked (latched) arrangement, the stackable case 10 and the tool case 20 also may be understood as constituting (forming) a case set (similar to the above-described case set), because they are coupled (linked) with each other in a stacked manner. The (upper) tool case 20 may be placed on top of the stackable case 10 in a stacked manner and linked (joined) together via the latches 15 disposed at four locations, in a similar manner as was described above for locking the lid 12 in its closed position. More specifically, the tool case 20 may include a case main body 21 and a lid 22. Latches (interlocking latches) 25, which may be identical to the above-described latches 15, may be provided at four locations around the case main body 21, which are used to join (link) the tool case 20 to another case disposed on top of it or to lock the lid 22 in its closed position. A logo or other mark(s) of the manufacturer of the tool case 20 may also be shown on these latches 25. When the four latches 15 of the stackable case 10 are slid (moved) upward in the respective recesses 11a, they are in a position to be elastically fitted onto and engaged with both the respective (corresponding) engagement protrusions 12b on the lid 12 and the respective (corresponding) connection protrusions (not shown) on the tool case 20. By pushing the latches 15 onto both sets of connection protrusions, the stackable case 10 and the tool case 20 will be linked (joined) in a stacked manner. As shown in FIG. 10, the latches 25 hold the lid 22 in its closed state by being disposed in (slid to) their lowermost vertical position, so as to not protrude above the upper surface of the tool case 20.

As further shown in FIG. 10, the carrying handle 13 and the handle storage recess 12e also may be provided on the upper surface of the lid 22 of the tool case 20, in a manner similar or identical to the stackable case 10. Furthermore, the front and rear relief recesses 12f may be formed in the handle storage recess 12e so as to allow the carrying handle 13 to be easily tilted up toward the front side in a use (carrying) position. Moreover, the logo display recess 12d may be arranged in front of the carrying handle 13 to show a logo or other mark(s) of the manufacturer of the tool case 20.

Figure 3:
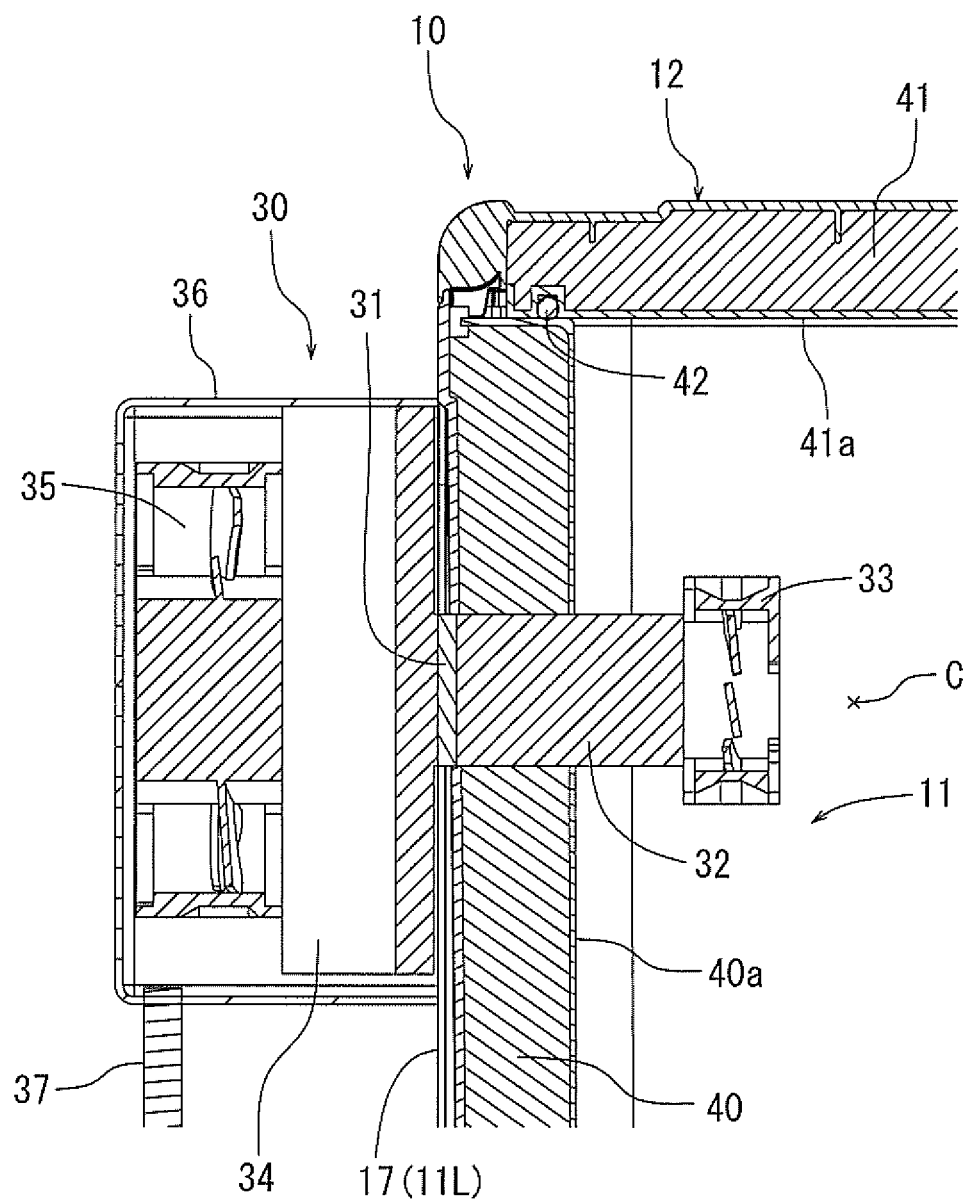
FIG. 3 is a vertical cross section of a cooling device according to the first embodiment.

As will be further described below, in one aspect of the present teachings, a cooling device is preferably provided in or on one of a plurality of stackable cases, which each have the latches 15 and the connection protrusions 11d. FIGS. 1 to 3 show a first representative cooling device 30 according to the first embodiment, which may be mounted in (on) the stepped portion (recess) 17 on the left side surface 11L of the case main body 11. It should be understood that, although the term "cooling device" is used with respect to device 30, this "cooling device" optionally may be configured to also, or instead of cooling, perform a warming/heating function. Thus, the "cooling device" may also be a "cooling/warming device" or simply a "warming device" according to some embodiments of the present teachings. Preferably, thermoelectric devices may be utilized with the present teachings and they operate by applying a voltage (current) across the thermoelectric device, e.g., a solid-state device. However, the present teachings are not particularly limited to such thermoelectric devices and vapor-compression refrigerating systems and/or resistive heating wires optionally may be used in some aspects of the present teachings.

The cooling device 30 may be configured to perform the cooling and/or warming function by using one or more Peltier elements 31, which are also known in the art as Peltier devices, Peltier heat pumps, solid state refrigerators, thermoelectric coolers (TEC), or more generally as thermoelectric devices. The Peltier element 31 may be designed as a thermally conductive element having a rectangular flat plate shape and having heat transfer or heat pump properties such that, when a voltage (current) is applied across it, one surface (cooling surface) is cooled while the other surface (heating surface) is heated. Known Peltier elements may be used for the element 31, because the present teachings are not particularly limited in this regard. For example and without limitation, the Peltier element 31 may be a thermoelectric device configured as a solid-state active heat pump that transfers heat from one side of the device to the other, with the consumption of electrical energy, depending on the direction (polarity) of the current flow. Two or more such devices may be used in conjunction to achieve greater heating/cooling effects.

As shown in FIGS. 2 and 3, a (e.g., cooling-side) heat sink 32, e.g., made of aluminum, contacts the right side (e.g., the cooling (cold) surface side) of the Peltier element 31. The heat sink 32 passes through, and is fixed to, the left side of the case main body 11. A fan 33 may be attached to the terminal (tip) end of the heat sink 32, which projects into the case main body 11. When the Peltier element 31 is being operated to cool the interior of the case 10, the heat sink 32 becomes colder than the surrounding atmosphere in the interior (storage compartment C) of the case 10 and thus absorbs heat from the surrounding atmosphere to transfer the heat to the cooling surface side of the Peltier element 31. The fan 33 accelerates this heat transfer by increasing the flow rate of the atmosphere in the storage compartment C that contacts the heat sink 32. The interior (storage compartment C) of the stackable case 10 may thereby serve (function) as a cold storage space (compartment).

On the opposite side, fins 34, e.g., made of aluminum, contact the left side of the Peltier element 31, which is the hot side of the Peltier element 31 when the cooling device 30 is being operated to cool the interior of the stackable case 10. A fan 35 may be arranged on the left side of the fins 34. A cover 36 may cover the fins 34 and the fan 35. A plurality of exhaust ports (holes) 36a may be formed in the left side of the cover 36. By placing the fins 34 and the fan 35 on the left side, heat generated by the Peltier element 31, when it is being operated to cool the storage compartment C, can be more efficiently discharged via the fins 34 and the fan 35 to the outside through the exhaust ports 36a, thereby improving the cooling performance (efficiency) of the cooling surface side of the Peltier element 31. A power supply cord 37 for supplying power to the Peltier element 31, the fan 33 and the fan 35 may pass through a lower surface side of the cover 36.

As shown in FIG. 2, the inner surface of the case main body 11 and the inner surface of the lid 12 may be respectively covered with heat insulation materials 40, 41. For example polystyrene foam panels may be used as the heat insulation materials 40, 41, although a variety of heat insulation materials may be utilized with the present teachings, such as fiberglass, polyethylene foam, cellulose, cotton, etc. The inner surfaces of the heat insulation materials 40, 41 may be covered with resin (hard plastic) inner panels 40a, 41a, respectively. The heat insulation materials 40, 41 reduce heat transfer (heat flow) between the interior (storage compartment C) and the exterior of the case 10, thereby increasing the cold or heat retention capability of the storage compartment C within the case main body 11. A seal or gasket 42 may be attached to an inner peripheral edge of the lid 12 for the purpose of thermal insulation and waterproofing. That is, the water-tightness and the cold (or heat) retention capability within the interior (storage compartment C) of the stackable case 10 can be improved by contacting and pressing the seal 42 against the upper surface (around the opening) of the case main body 11.

Figure 4:
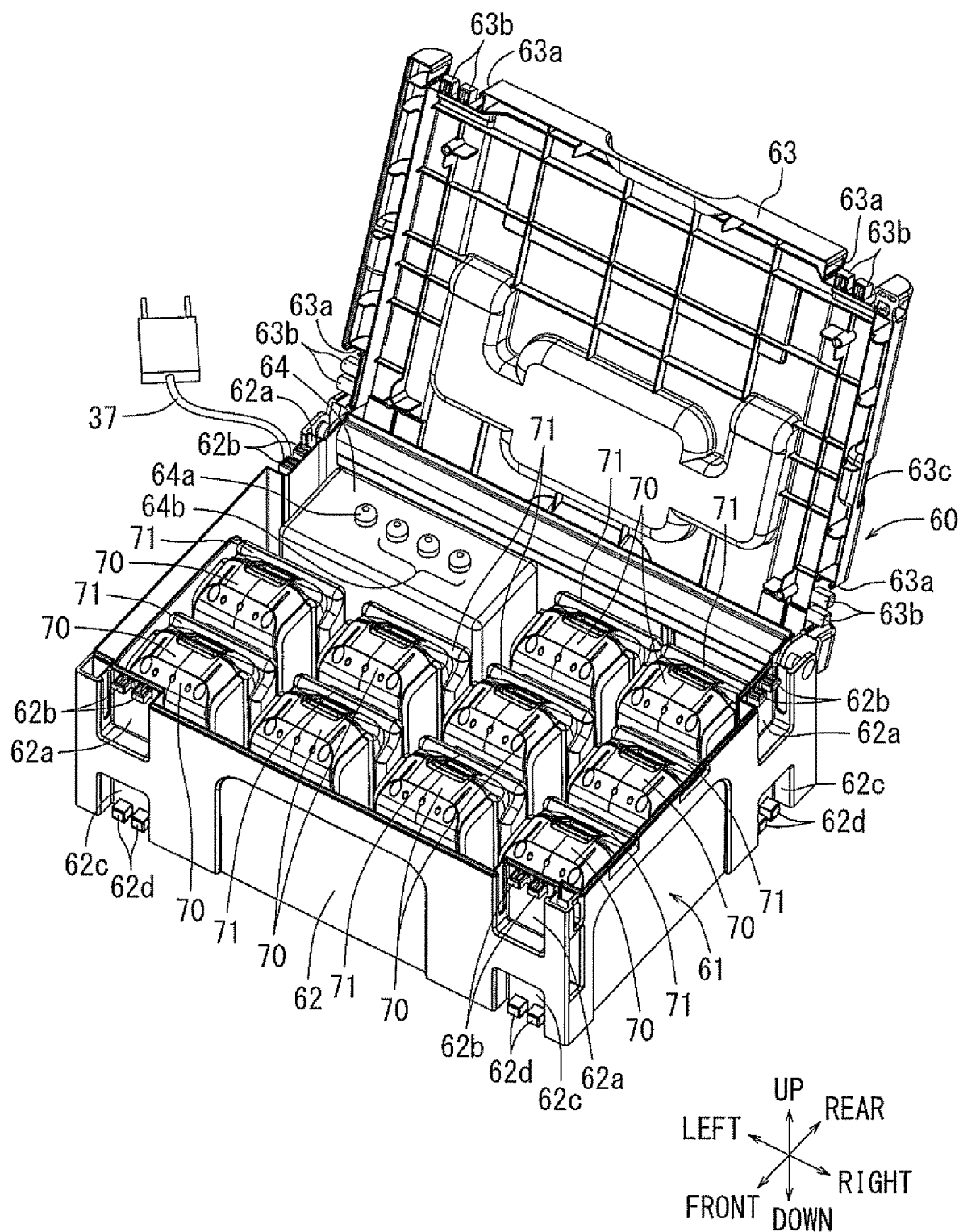
FIG. 4 is a perspective view of the power supply case with its lid opened.

According to the above-described first embodiment, power may be supplied to the Peltier element 31 and the fans 33, 35 by the above-mentioned power supply device 60, which serves as the power source and houses (stores) a plurality of battery packs within the power supply case 61. FIG. 4 shows a representative power supply device 60, which will now be described in greater detail. The power supply device 60 may be configured to house, for example, ten battery packs 70 in total within the power supply case 61 that has a stack-coupling mechanism (e.g., the latches 65, which were briefly mentioned above and will be further described below).

The power supply case 61 may include a lid 63 that is pivotably attached to a case main body 62. Similar to the stackable case 10, the power supply case 61 preferably also has interlocking latches 65 and protrusions 62b, 63b on the case main body 62 and the lid 63, respectively, for connecting (linking) the power supply case 61 to the stackable case 10 (or to a power tool case 20) in the stackable manner described above. For example, recesses 62a may be formed in (on) the upper portions of the front of and the upper portions on the left and right sides of the case main body 62. The latches (interlocking latches) 65 (not shown in FIG. 4, see FIG. 1) may be supported in the recesses 62a such that they are each vertically displaceable (slidable) in, and tiltable with respect to, the corresponding recesses 62a in the same manner as the above-described latches 15, 25. A pair of left and right engagement protrusions 62b may be arranged in the bottom portion of each recess 62a. Recesses 62c may be formed in the lower portions in front of and in the lower portions on the left and right sides of the case main body 62. A pair of left and right engagement protrusions 62d may be arranged in the bottom portion of each recess 62c. Recesses 63a may be arranged in front of and on the left and right sides of the lid 63 and a pair of left and right engagement protrusions 63b may be arranged on the bottom portion of each recess 63a. A carrying handle (not shown) may be provided in the middle of the upper surface of the lid 63 in a manner similar to the carrying handle 13 described above. As shown in FIG. 4, belt attachment pins (belt hanging portions or anchors) 63c may be provided on the left and right sides of the lid 63 for hanging (anchoring) the shoulder belt 159.

The power supply device 60 can be joined, connected or linked: (i) to the lower side of the stackable case 10 in a stacked manner by using the above-described latches 65 and protrusions 11d, 62b, 63b, or (ii) to the upper side of the stackable case 10 by using the above-described latches 15 and protrusions 11b, 12b, 62d. Consequently, because the stackable case 10 and the power supply device 60 can be carried together as one joined (integrated) unit, convenience can be greatly improved due to ease of portability. In addition, the stackable cases can be prevented from laterally displacing relative to each other in response to, for example, vibrations applied to the stackable cases when they are stored in a vehicle that is being driven, e.g., to a work site.

In addition to being housed within the case main body 62, the ten battery packs 70 also may be electrically connected such that power can be output from the ten battery packs 70, e.g., via the power supply cord 37. As shown in FIG. 4, the ten battery packs 70 optionally may be arranged in two parallel rows of four battery packs 70 and one row of two battery packs 70 on the rear side thereof. A power supply controller 64 may be housed in a left, rear portion of the case main body 62 adjacent to the battery packs 70 and thus may be fixed in a predetermined position of the case main body 62.

Figure 5:
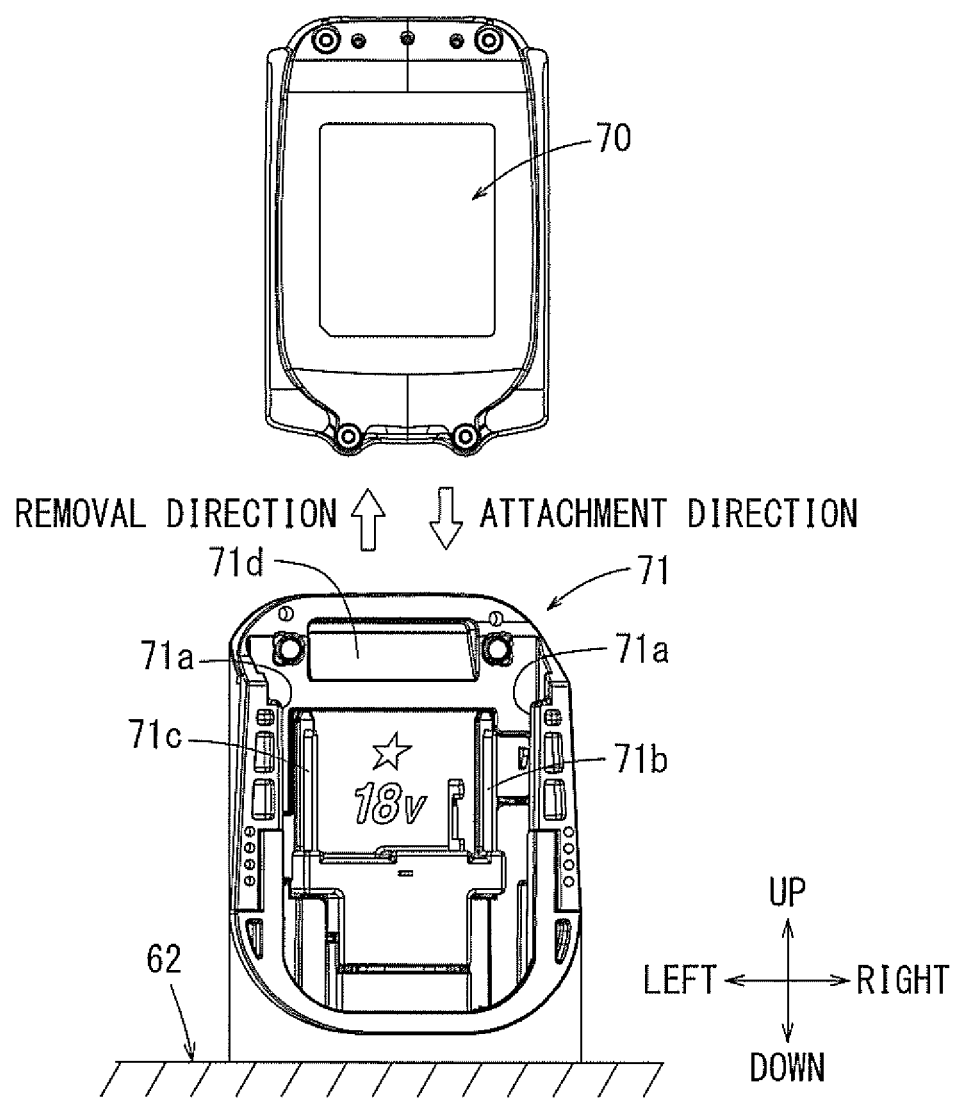
FIG. 5 is a side view showing how a battery pack is attached to or removed from a battery-mounting portion.
Figure 6:
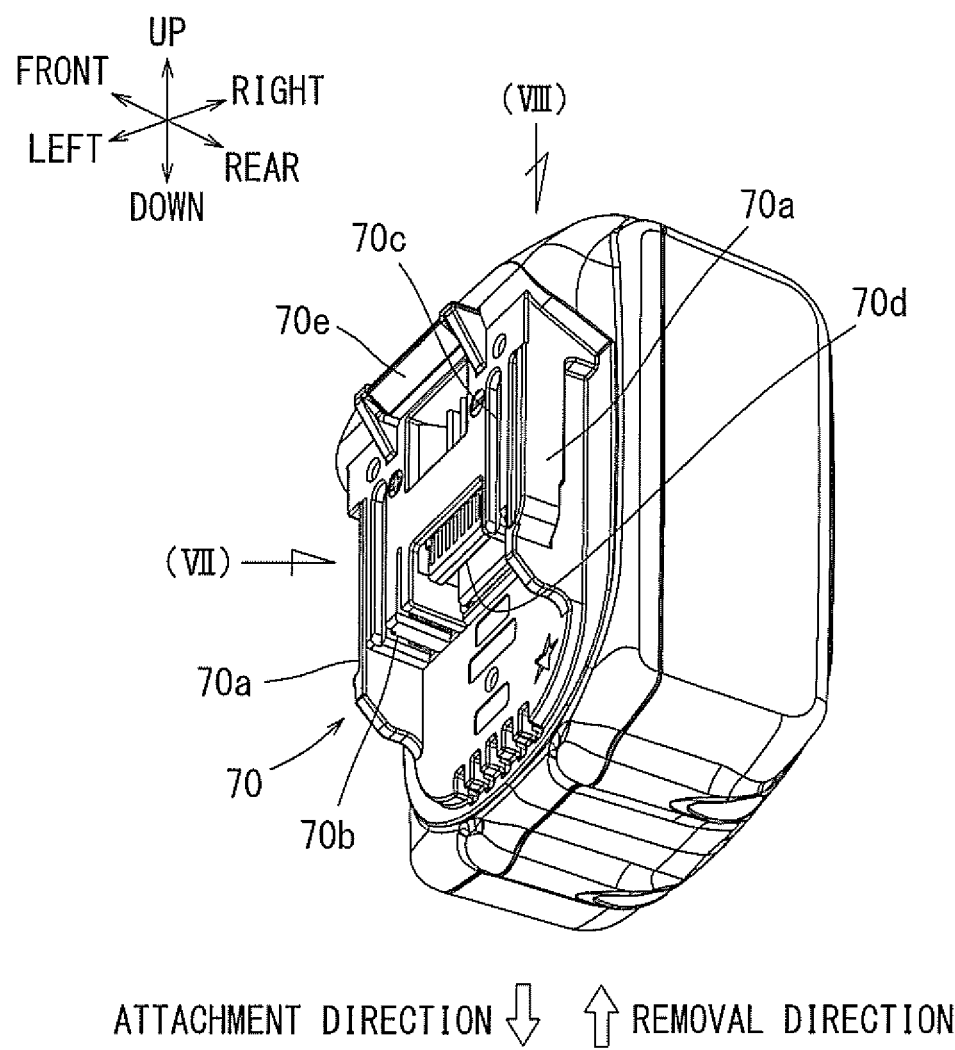
FIG. 6 is a perspective view of a single battery pack.
Figure 7:
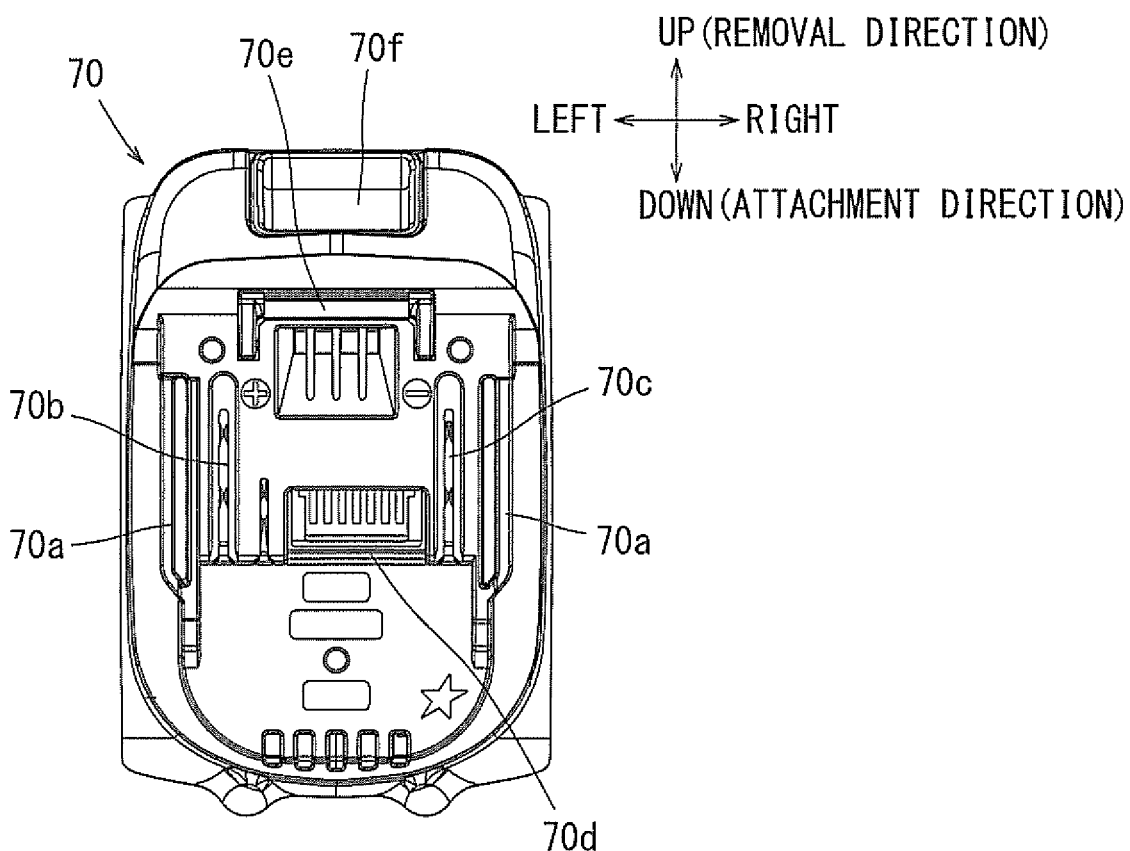
FIG. 7 is a plan view of the battery pack.
Figure 8:
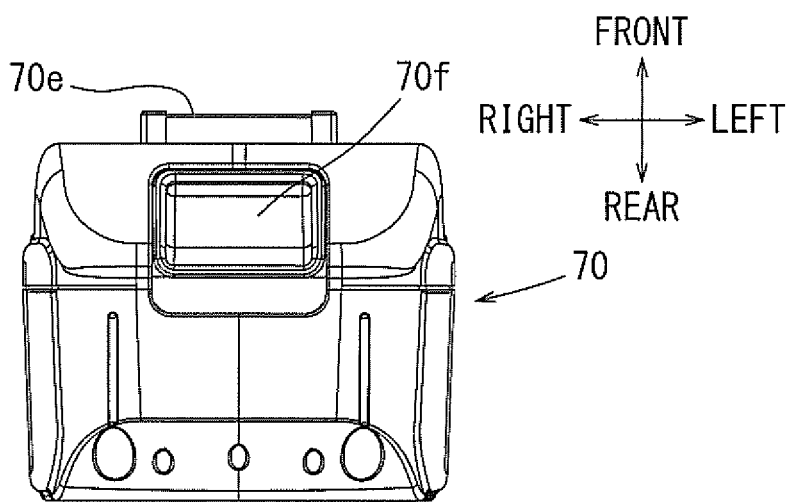
FIG. 8 is a top view of the battery pack.

The ten battery backs 70 may be respectively mounted on (in) ten battery-mounting portions (cradles) 71. As shown in FIG. 5, each battery-mounting portion 71 may be arranged so as to extend upright from the bottom surface of the case main body 62. FIGS. 6 to 8 show exterior views of a representative, non-limiting battery pack 70. Each battery pack 70 according to the present embodiment may be configured such that two or more lithium ion battery cells are housed within a rectangular parallelepiped battery case and are connected in series to generate an 18V output voltage. These rechargeable battery packs 70 may be repeatedly used by being removed from the battery mounting portions 71 and charged in a separate, dedicated charger, which serves as one representative means for charging the battery pack according to the present teachings. Furthermore, such battery packs 70 preferably may be designed as highly-versatile, slide-mounting-type battery packs that can be used as the rechargeable battery for a variety of types of electric power tools such as, for example, driver drills, hammer driver drills, impact wrenches, circular saws, grinders, etc. Although 18V battery packs are presently preferred for use with the present teachings, the rated output voltage of the battery packs may be varied according to application. For example, e.g., one or more 18-36V battery packs optionally may be used to supply power to the cooling/warming devices according to the present teachings.

A pair of left and right rail receiving parts 70a may be arranged on a front surface of the battery pack 70. A pair of positive and negative terminal receiving slots 70b, 70c may be respectively arranged within the left and right rail receiving parts 70a. A connector 70d may be disposed between the positive and negative terminal receiving parts 70b, 70c and is configured to communicate (transmit and receive) various types of control signals between a controller located in the battery pack 70 and a controller located in the charger and/or the power tool and/or the controller 64 of the power supply device 60. A movable lock claw (latch) 70e may be provided above the connector 70d. This lock claw 70e may be biased in a direction to protrude toward the front by a spring that is attached within the battery case. As shown in FIG. 8, an unlock button 70f may be arranged on the upper surface of the battery pack 70 and may be integrally formed with the lock claw 70e. Consequently, the lock claw 70e can be moved downwardly (unlock side) in an insertion direction against the biasing force of the spring when the unlock button 70f is pushed down (in the rearward direction according to the directions shown in FIG. 6).

Each battery-mounting portion 71 may have the same configuration. For example, as shown in FIG. 5, each battery-mounting portion 71 may include a pair of left and right rails 71a that extend in the vertical (up) direction relative to the bottom surface of the case main body 62. A pair of positive and negative connection terminals 71b, 71c may be respectively disposed within the left and right rails 71a. An engagement recess 71d may be formed in an upper portion of the battery-mounting portion 71 to latchably receive the lock claw 70e of the battery pack 70. As shown by the arrows in FIG. 5, one battery pack 70 can be mounted in each battery mounting portion 71 by sliding the battery pack 70 from up to down relative to the battery mounting portion 71. Conversely, the battery pack 70 can be removed from the battery mounting portion 71 by sliding the battery pack 70 upward with the unlock button 70f pushed downward toward the unlock side and the lock claw 70e released from the engagement recess 71d.

The removed battery pack 70 can be mounted (again) on (in) the battery mounting portion 71 by sliding the battery pack 80 downward with its front oriented toward the battery mounting portion 71 as shown in FIG. 5 to allow the rails 71a to respectively enter the left and right rail receiving parts 70a. The battery pack 70 may be locked in the battery mounting portion 71 by sliding the battery pack 70 downward and fitting (engaging) the lock claw 70e in the engagement recess 71d. When the battery pack 70 is mounted on (in) the battery mounting portion 71, the positive and negative connection terminals 71b, 71c respectively enter the positive and negative terminal receiving parts 70b, 70c such that the battery pack 70 will be electrically connected to the battery mounting portion 71. The connector 70d of the battery pack 70 need not be electrically connected to the battery-mounting portion 71, although it may be electrically connected in certain embodiments, in which the controller of the battery pack 70 communicates with the controller 64. As was noted above, the connector 70d is designed to be electrically connected to one or more connector terminals on the charger or on the power tool, in order to communicate various control signals to/from the charger or the power tool when the battery pack 70 is mounted on the charger or the power tool, respectively.

Each of the ten battery-mounting portions 71 may be electrically connected to the power supply controller 64. The power supply controller 64 may be designed, e.g., to selectively output an 18V current or a 36V current by appropriately connecting (in series and/or in parallel) (and/or by disconnecting) the respective battery packs 70. For example, as shown in FIG. 4, one start button 64a for starting the controller 64 and three switch buttons 64b for switching between the 18V output and the 36V output may be arranged on the upper surface of the power supply controller 64. The power supply cord 37 for supplying (conducting) current (power) to the Peltier element 31, etc. extends from the power supply controller 64.

Figure 9:
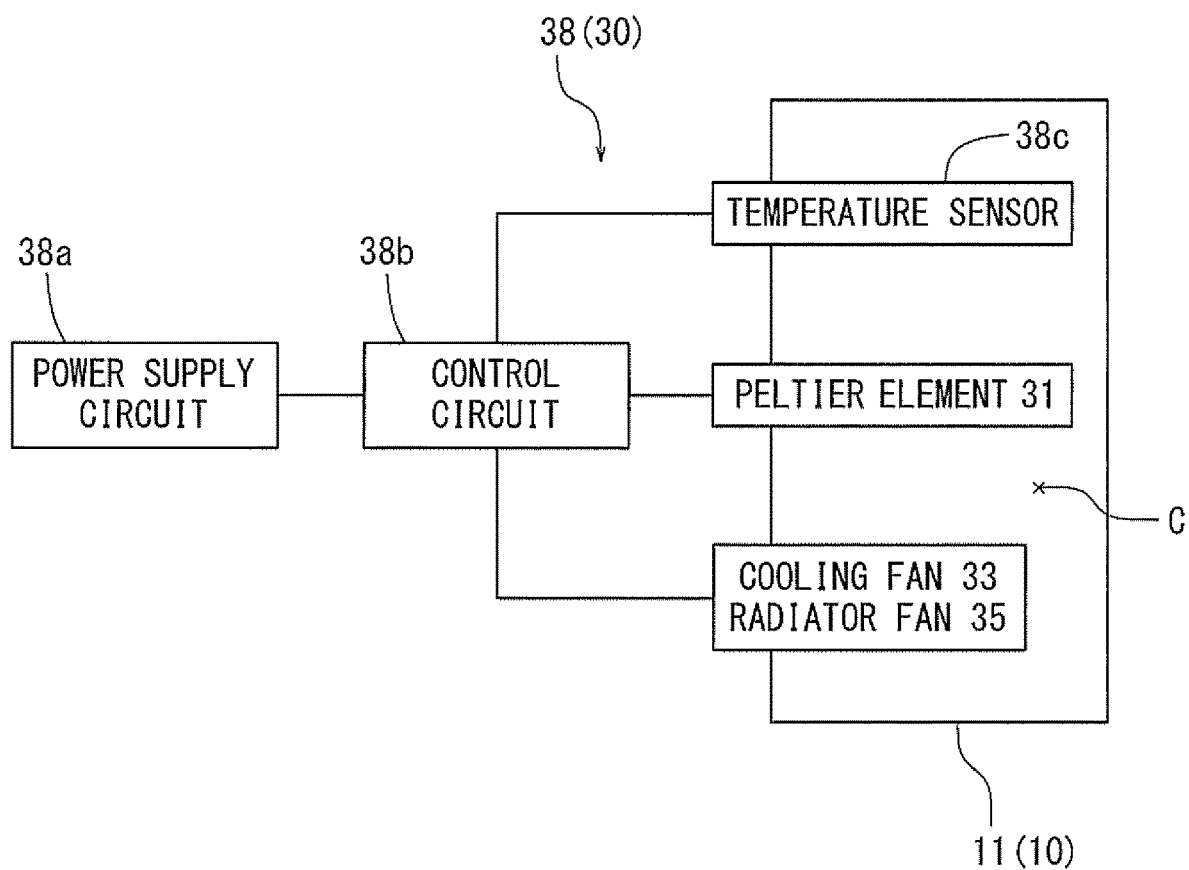
FIG. 9 is a block circuit diagram of the cooling device.

The operation of the cooling device 30, which can be operated using power supplied from the power supply device 60, may be controlled in accordance with a controller 38, as shown in block form in FIG. 9. The controller 38 may include a power supply circuit 38a having (or disposed on) a power supply circuit board and a control circuit 38b having (or disposed on) a control circuit board. The supply of power to the Peltier element 31 and to the fans 33, 35 may be controlled in (by) the control circuit 38b in accordance with the temperature sensed by a temperature sensor 38c disposed within the storage compartment C.

The interior (inner chamber) of the stackable case 10 according to the first embodiment having the above-described configuration may be cooled (kept cool) by operating the cooling device 30, i.e. by supplying current to the Peltier element 31. Therefore, beverages, food, etc. can be kept cool or cold within the stackable case 10. Furthermore, the stackable case 10, the tool case 20 and/or the power supply device 60 can be stacked and linked (connected) together to make them easily portable by holding only a single carrying handle (13). Consequently, food, beverages, etc. can be kept cold and carried more conveniently to a work site, where the electric power tool and its accessories are used. Therefore, the present embodiment extends the applicability or versatility of known stackable cases.

Further, it may be possible to provide a cooling function (cooling capability) to the stackable case 10 without substantially and/or greatly increasing cost because the cooling device 30 is configured to cool the interior of the stackable case 10 by utilizing the cooling function (capability) of the Peltier element 31, which is widely available in the market. Moreover, the cooling function may be added to known stackable cases having no cooling function.

Furthermore, the cooling device 30 according to the first embodiment may be configured to employ the battery packs 70 as its power source, which are designated to be used as the power source for rechargeable electric (cordless) power tools such as driver drills, etc. Therefore, the battery packs 70 can be shared (used) as a power source for both the cooling device 30 and such electric power tools. In this regard, the stackable case 10 can be used more conveniently, because it does not require a dedicated or special source of power.

Further, since the power supply device 60 having the plurality of battery packs 70 (DC power source) housed therein can be used as the power source, the cooling function of the stackable case 10 can also be used anywhere, such as e.g., outdoors where no outlet for an AC power source is available. In addition, because the rechargeable battery packs 70 can be repeatedly used by recharging, the stackable case 10 can be used conveniently.

Figure 11:
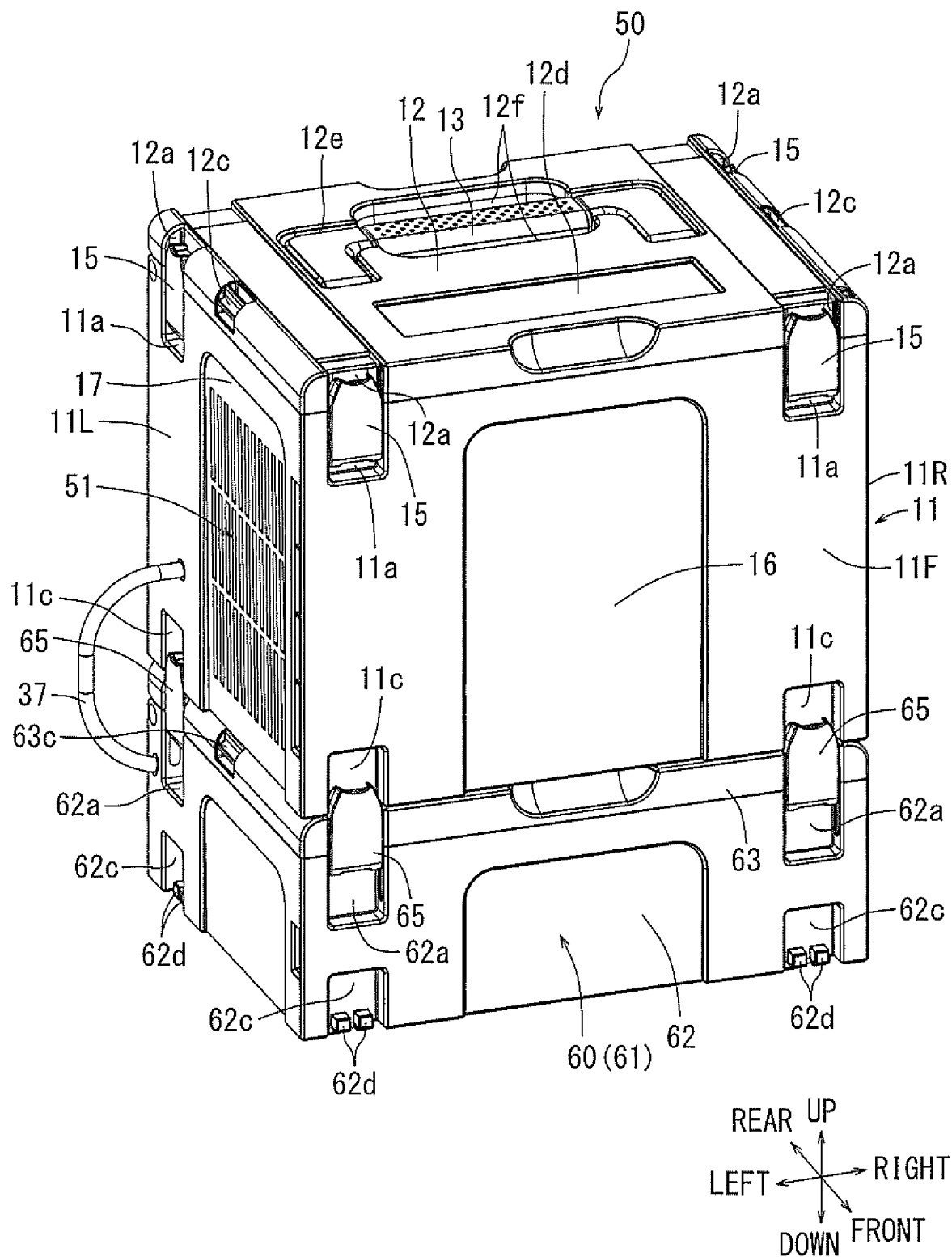
FIG. 11 is a perspective view of a stackable case according to another embodiment (second embodiment) with a power supply case placed on a lower side in a stacked manner.
Figure 12:
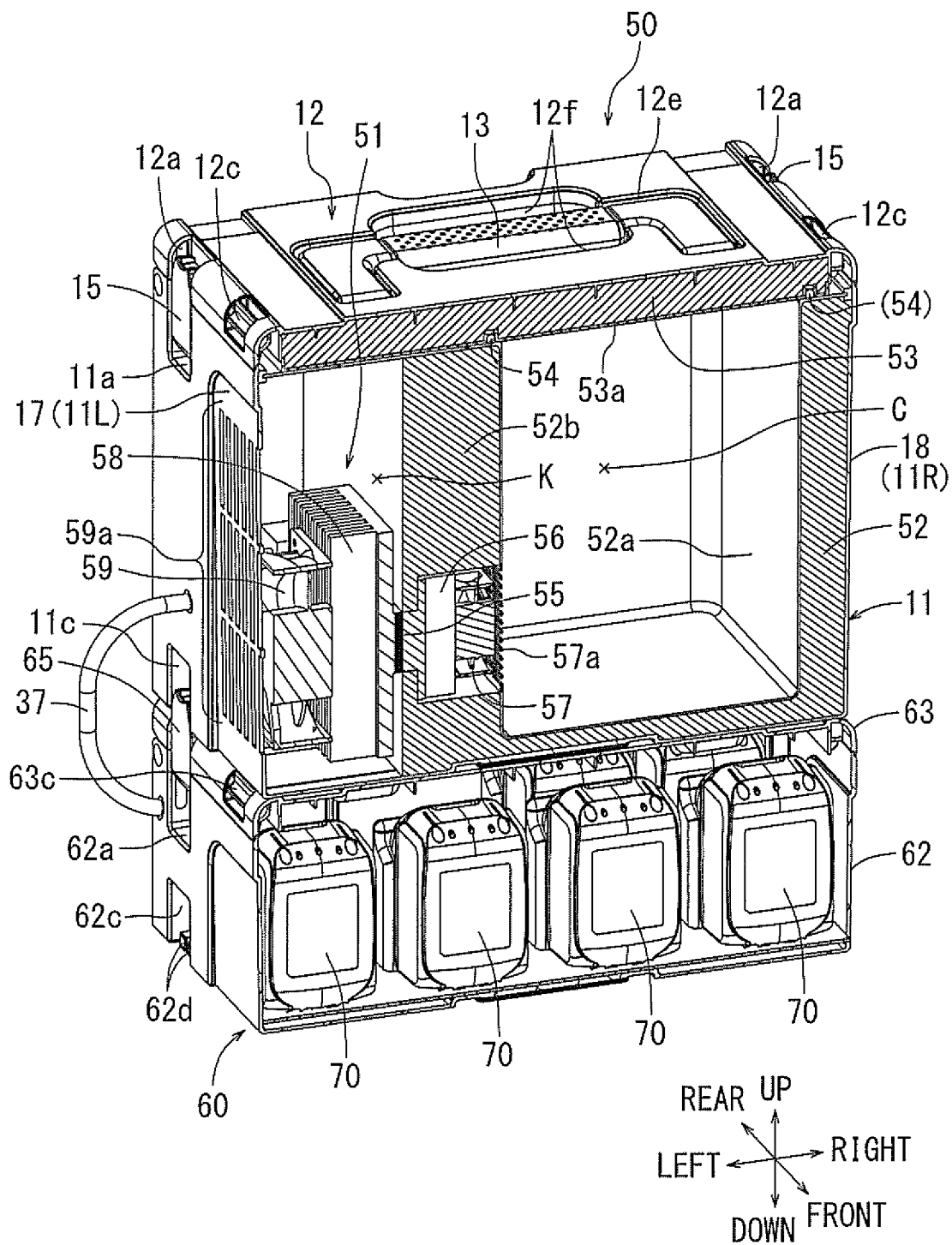
FIG. 12 is a perspective view of the stackable case according to the second embodiment in a vertical cross section.
Figure 13:
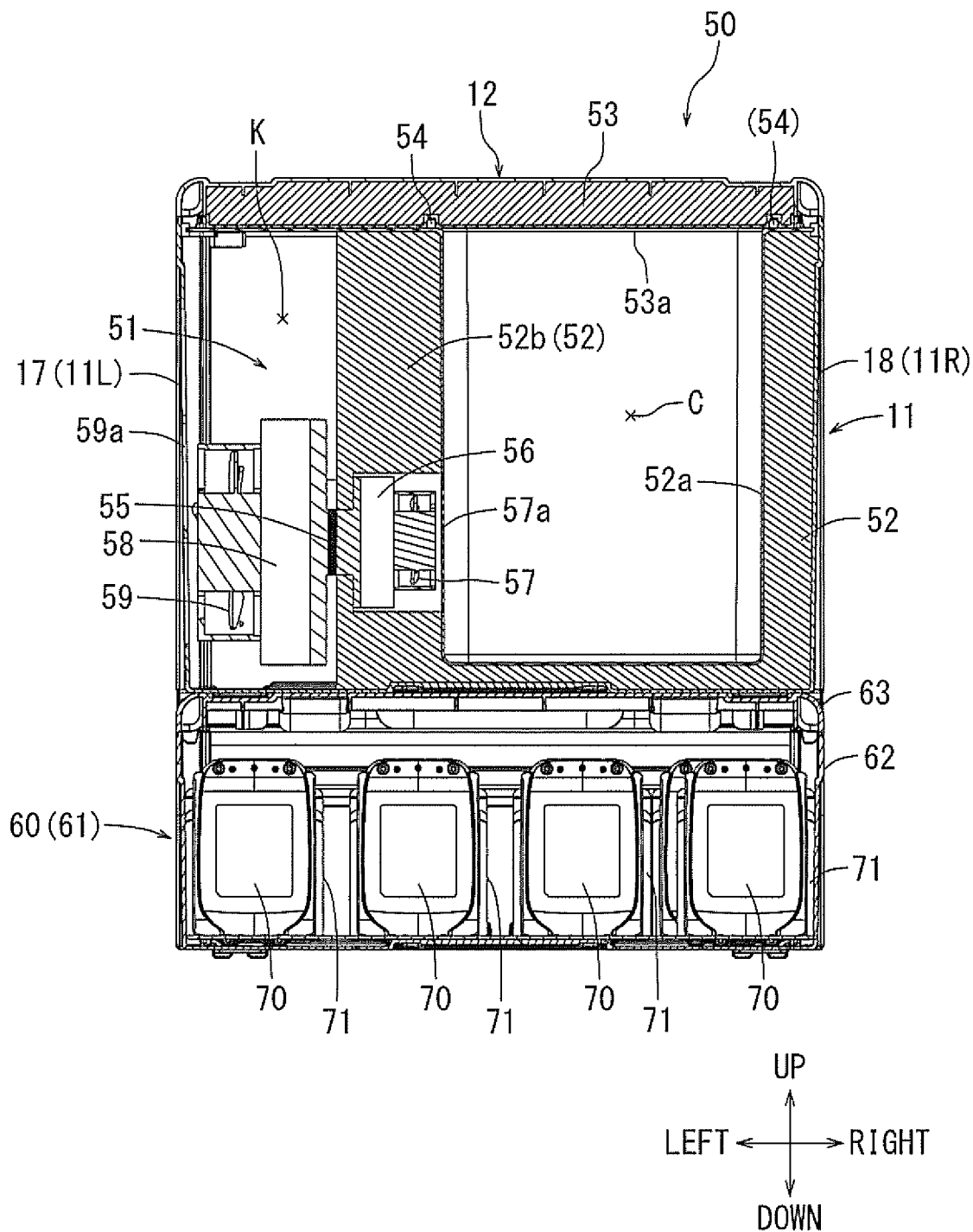
FIG. 13 is a vertical cross section of the stackable case according to the second embodiment.

Various modifications may be made to the stackable case 10 according to the first embodiment without departing from the spirit or gist of the present invention. For example, FIGS. 11 to 13 show a stackable case 50 according to a second embodiment of the present teachings, which differs from the stackable case 10 according to the first embodiment in that a cooling device 51 is located (arranged) within the case main body 11. Descriptions of the structural elements and configurations in common with the first embodiment are omitted for conciseness purposes, and it is noted that structural elements denoted with the same reference numerals in the second embodiment may be identical to the corresponding structural elements described above with regard to the first embodiment.

Similar to the first embodiment, the stackable case 50 according to the second embodiment may be coupled (linked, joined) on (to) the power supply device 60 in a stacked manner. The stackable case 50 according to the second embodiment may include a case main body 11 and a lid 12. Latches (interlocking latches) 15 may be provided at four locations around the case main body 11, and are used to connect or link the stackable case 50 to another stackable case (e.g., the above-described tool case 20, power supply device 60, etc.).

As shown in FIGS. 12 and 13, the interior of the case main body 11 may be partitioned by a heat insulation material 52. The inner surface of the lid 12 may also be covered with heat insulation material 53. A space partitioned (defined) by the heat insulation materials 52, 53 may form a storage compartment C. The heat insulation material 52 on the side of the case main body 11 and the heat insulation material 53 on the side of the lid 12 may be covered with resin (hard plastic) inner panels 52a, 53a, respectively. A seal or gasket 54 may be attached to the heat insulation material 53 on the lid 12. The storage compartment C may be kept cool and/or waterproofed by pressing the seal 54 against the upper surface of the heat insulation material 52 (or the inner panel 52a covering it), with the lid 12 closed.

The cooling device 51 may be disposed in a second (functional) compartment K, which is partitioned by the partitioning portion 52b of the heat insulation material 52 from the storage compartment C within the case main body 11. The cooling device 51 according to the second embodiment may include a Peltier element 55, a (cooling-side) heat sink 56, a fan 57, fins 58 and a fan 59. A plurality of exhaust ports (holes) 59a may be formed in the left side of the second compartment K (i.e. in the left side of the case main body 11).

The heat sink 56 and the fan 57 may be held (supported) by the partition 52b of the heat insulation material 52. An air outlet port (hole) 57a may be provided in the right side of the partition portion 52b in front of the fan 57. The fan 57 is preferably designed to blow the cold air (or hot air, if the current is switched) generated by the Peltier element 55 through this air outlet port 57a into the storage compartment C.

According to the stackable case 50 of the second embodiment, because the cooling device 51 is arranged within the case main body 11 and does not extend beyond the left side thereof, the overall size (outer dimensions) of the case 50 can be reduced as compared to the first embodiment, although the interior volume of the storage compartment C also is reduced as compared to the first embodiment. Furthermore, the stackable case 60 of the second embodiment protects the cooling device 51 by internalizing the components thereof, thereby reducing the likelihood of damage to the cooling device 51 during transport and usage.

Next, a stackable case 80 according to a third embodiment will be described with reference to FIG. 14. The stackable case 80 according to the third embodiment is configured such that it does not require the (separate) power supply device 60 of the first and the second embodiments. That is, the stackable case 80 according to the third embodiment is configured such that its power source is mounted within the second (functional) compartment K of the second embodiment. Again, descriptions of the structural elements and configurations in common with the first and second embodiments are omitted in case the same reference numerals are utilized. The cooling device 51 may be housed in the second (functional) compartment K in a manner similar to the second embodiment.

A battery-mounting portion (cradle) 81 may be arranged above the cooling device 51 in the second component K. One battery pack 70 may be attached (electrically connected) to this battery-mounting portion 81. The cooling device 51 according to the third embodiment may be operated by this battery pack 70 as its power source. In the alternative, the cooling device 51 may be configured to be operated by a plurality of the battery packs 70 as its power source, similar to the first and second embodiments. The battery-mounting portion(s) 81 may have the same configuration as the battery-mounting portions 71 of the power supply device 60. Therefore, another battery pack 70 housed in another case (such as the tool case 20 or the power supply device 60) placed on the stackable case 80 may be used as this battery pack 70. The battery pack 70 can be mounted on or removed from the battery-mounting portion 81 when the lid 12 is open. The battery pack 70 can be mounted on the battery-mounting portion 81 by sliding the battery pack 70 downward, and can be removed by sliding it upward. According to the third embodiment, the cooling device 51 and the battery-mounting portion 81 optionally may be assembled together within the second compartment K as one single unit (cooling unit).

According to the stackable case 80 of the third embodiment, because the cooling device 51 is housed (stored) within the second (functional) compartment K and does not to extend beyond the left side of the case 80, the overall size (width) and weight of the stackable case 80 can be reduced as compared with a case that utilizes the separate power supply device 60. As a result, the stackable case 80 can be carried more easily. On the other hand, when the power supply device 60 is used as the power source (first and second embodiments), the cooling device 51 can be operated for a longer period of time. However, if the contents of the storage compartment C need to be kept cool or cold for only a short period of time, the stackable case 80 of the third embodiment may be used to significantly reduce the overall weight and improve the ease of portability.

Furthermore, according to the stackable case 80 of the third embodiment, the cooling device 51 and the power source (battery pack 70 and battery mounting portion 81) may be formed as one unit and housed within the second (functional) compartment K as a single (integrated) cooling unit. Therefore, according to the third embodiment, the cooling unit can be additionally attached (attached afterward) to another stackable unit, or can be removed from the second compartment K more easily. Furthermore, the power supply device 60 can be used as a backup power source when the power supply device 60 is stacked on or under the stackable case 80. Conversely, the battery pack 70 within the second (functional) compartment K also may serve as a backup power source by using the power supply device 60 as a main power source.

Figure 15:
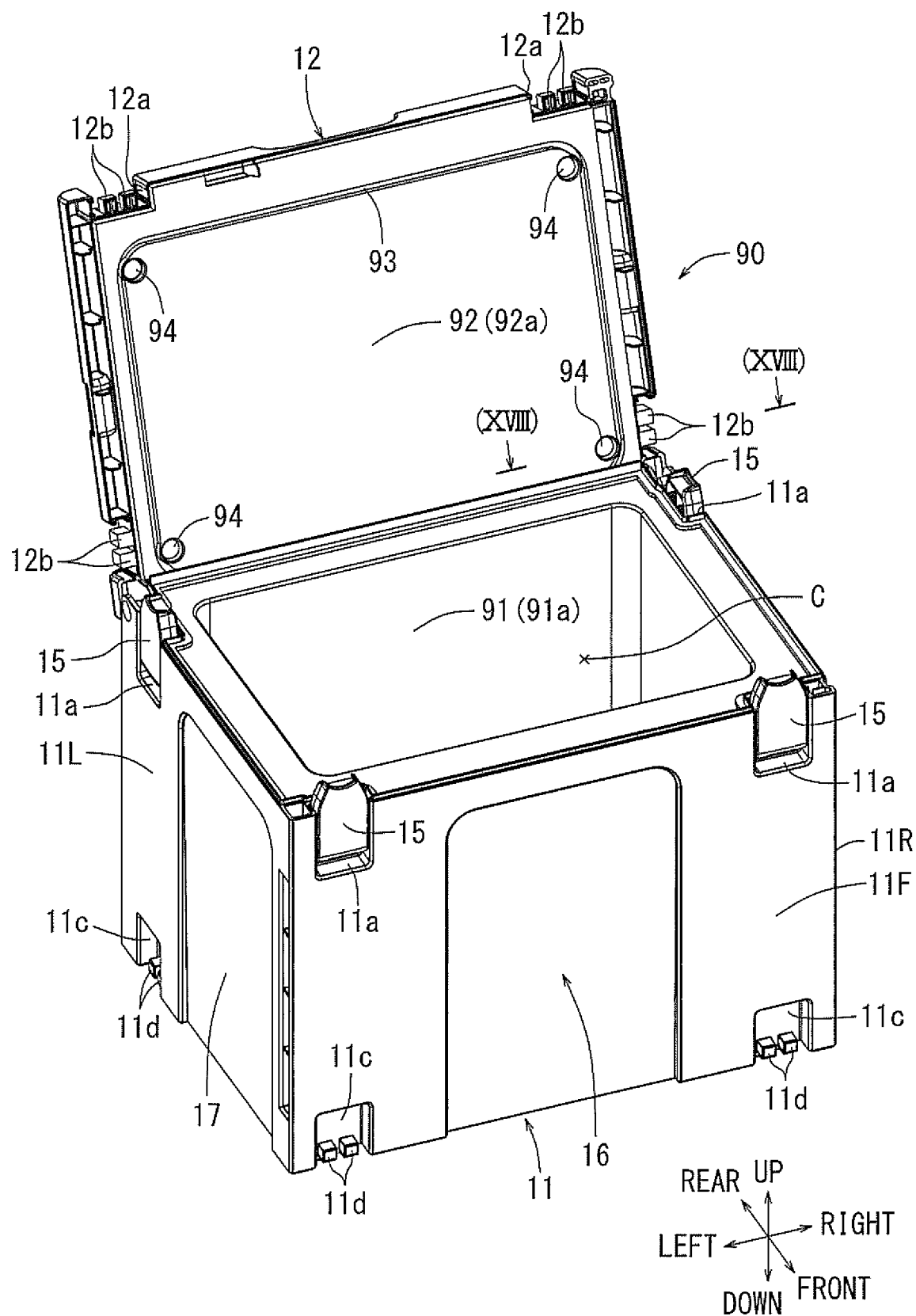
FIG. 15 is a perspective view of a stackable case according to another embodiment (fourth embodiment) with its lid opened.
Figure 16:
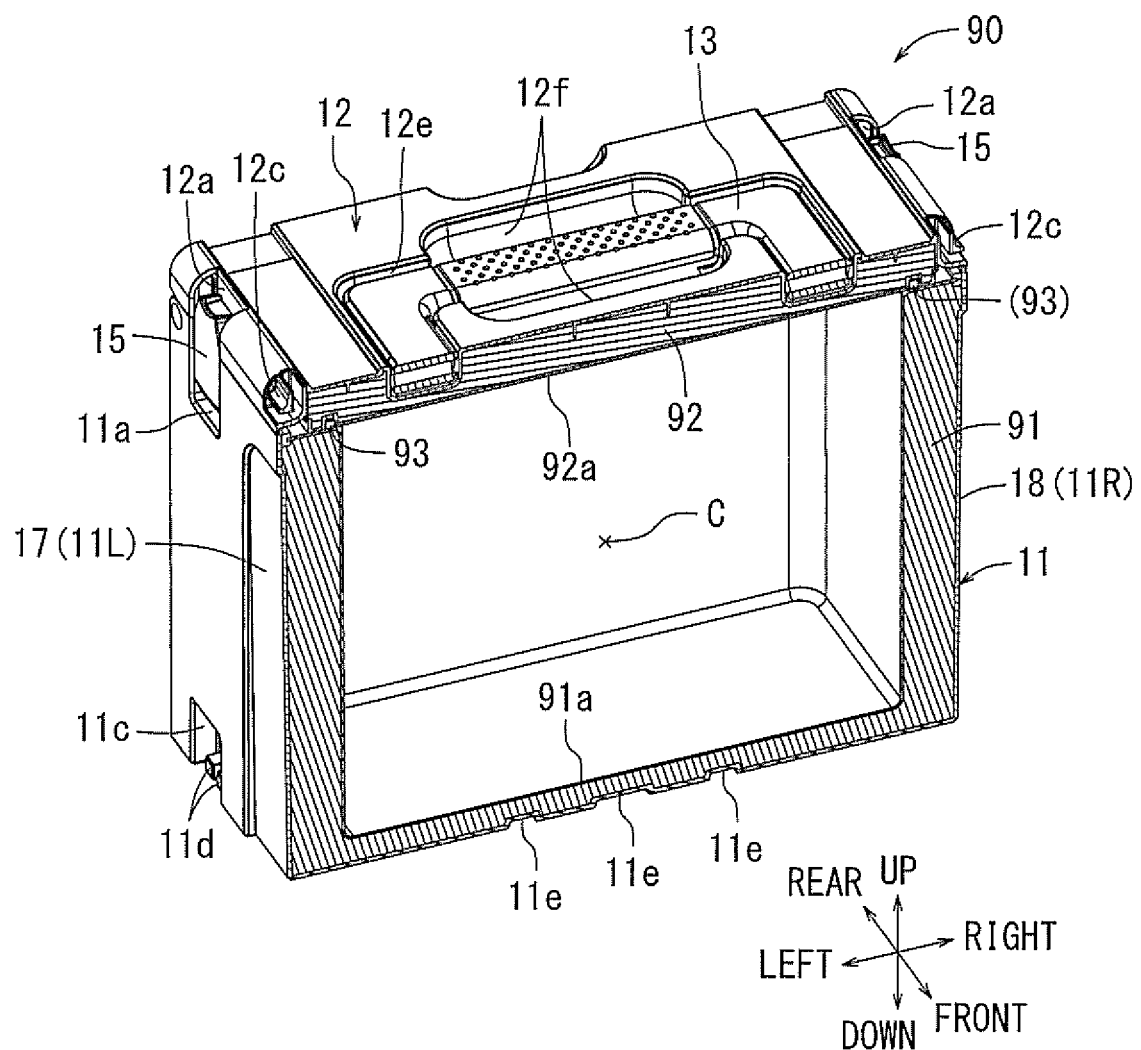
FIG. 16 is a perspective view of the stackable case according to the fourth embodiment in a vertical cross section.
Figure 18:
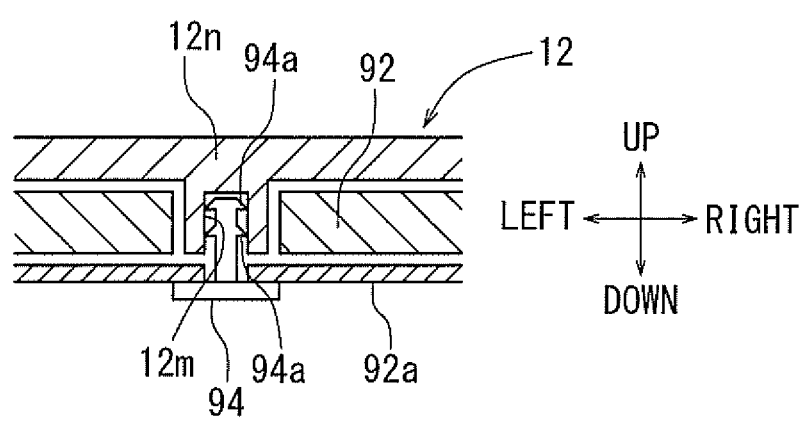
FIG. 18 is a cross-sectional view taken along line (XVIII)-(XVIII) of FIG. 15, showing a part where an inner panel is clipped.
Figure 26:
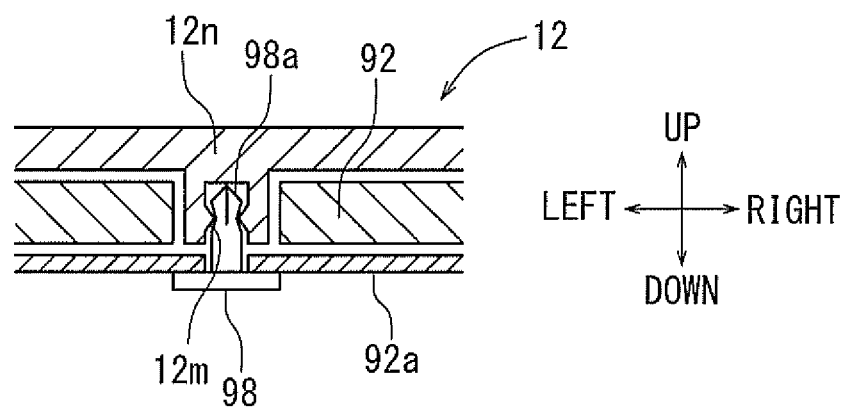
FIG. 26 is a vertical cross section showing a modification of the clip shown in FIG. 18.
Figure 27:
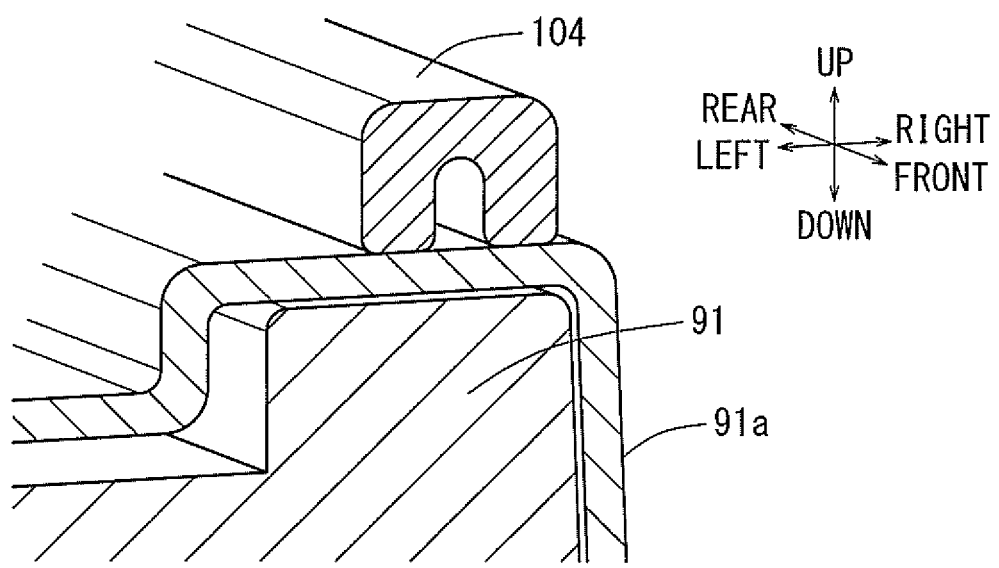
FIG. 27 is a vertical cross section showing a modification the gasket shown in FIG. 22.

A stackable case 90 according to a fourth embodiment will now be explained with reference to FIGS. 15 and 16. Once again, descriptions of the structural elements and configurations in common with any of the preceding embodiments are omitted when the same reference numerals are used for corresponding elements. The stackable case 90 may be configured (constructed) without the cooling device 30 of the first embodiment or the cooling device 51 of the second and third embodiments. In other words, the stackable case 90 according to the fourth embodiment does not include an active (powered) cooling/heating device, such as the Peltier element 31, 55. However, the stackable case 90 according to the fourth embodiment is configured such that the inner surface of the case main body 11 and the inner surface of the lid 12 are respectively covered with heat insulation materials 91, 92 to reduce heat transfer. A heat insulation material made of the same material (e.g., polystyrene foam, etc.) as that of the first to third embodiments may be used as the heat insulation materials 91, 92. The surface of the heat insulation materials 91 on the side of the case main body 11 may be covered with a first inner panel 91a and the surface of the heat insulation material 92 on the side of the lid 12 may be covered with a second inner panel 92a. As shown in FIG. 18, the second inner panel 92a may be fixed to an outer panel 12n of the lid 12 using clips (fixing members) 94 at its four corners. The clips 94 may each include two claws 94a. The first inner panel 92a may be fixed to the outer panel 12n of the lid 12 by press-fitting the clips 94 into respective engagement holes (bosses, hollow cylinders) 12m formed on (in) the outer panel 12n of the lid 12 and engaging the two claws 94a with the inner surface (barbed or smooth) of each of the engagement holes 12m. The claws 94a may extend continuously or discontinuously around the stem of the clip 94. The heat insulation material 92 may be waterproofed and also may be prevented from dropping (separating) from the lid 12 by fixing the first inner panel 92a to the outer panel 12n of the lid 12 with the clips 94 at its four corners. It is noted that, instead of the clips 94, the first inner panel 92a may be fixed to outer panel 12n of the lid 12 by clips (fixing members) 98 having only one claw 98a as shown in FIG. 26. The clips (fixing members) 94, 98 are also known in the art as locking hole plugs, panel retainers, retainer clips, panel fasteners, panel retaining clips, push-type retainers, etc., and generally comprise a flat head designed to contain a panel, a stem extending from the flat head and one or more claws, barbs, prongs, projections, threads, annular rings, etc. protruding laterally from the stem and being configured to engage in a hollow cylinder structure formed in or on the outer panel 12n. Such fixing members may be utilized to affix the inner and outer panels of the case main body or the lid in any of the embodiments disclosed herein.

A seal or gasket 93 may be attached to the inner surface (inner panel 92a) of the lid 12 similar to the first and second embodiments. The seal 93 may be attached to an outer circumferential side of each of the clips 94 along the inner peripheral edge of the inner panel 92a. The waterproofing performance and the cold or warm retention capability within the interior (storage compartment C) of the case main body 11 can be improved by pressing the seal 93 against the upper peripheral surface of the case main body 11 while the lid 12 is closed, thereby providing an insulating barrier between the heat insulation materials 91, 92. A logo or other mark(s) of the manufacturer of the stackable case 90 may be displayed in the middle of the inner panel 92a using letters, designs, patterns etc. The letters, designs, patterns etc. may be printed on a label affixed to the inner panel 92a, or may be directly printed (marked) or molded on the inner panel 92a.

The stackable case 90 according to the fourth embodiment may have one or more stack-connection mechanisms, similar to the preceding embodiments, that serve(s) to connect or link another case that is stacked on the stackable case 90 or vice versa, and may include, e.g., latches 15 and connection protrusions 11d. Therefore, the stackable case 90 according to the fourth embodiment may be connected or linked with one or two other stackable case(s) while being connected on the upper surface side and/or on the lower surface side in a stacked manner.

According to the stackable case 90 of the fourth embodiment, beverages, food, etc. can be kept cool or warm by being stored inside the case main body 11, which is thermally insulated from the outside by the heat insulation materials 91, 92. The stackable case 90 can be carried together with the tool case 20 (i.e. another stackable case) in which an electric power tool and/or accessories are housed in a stacked, linked manner. Similar to the preceding embodiments, food and/or beverages can be kept warm or cold and carried more conveniently to a work site, where electric power tools and accessories are used. In this regard, the applicability (utility) of the stackable case 90 can be extended.

Figure 17:
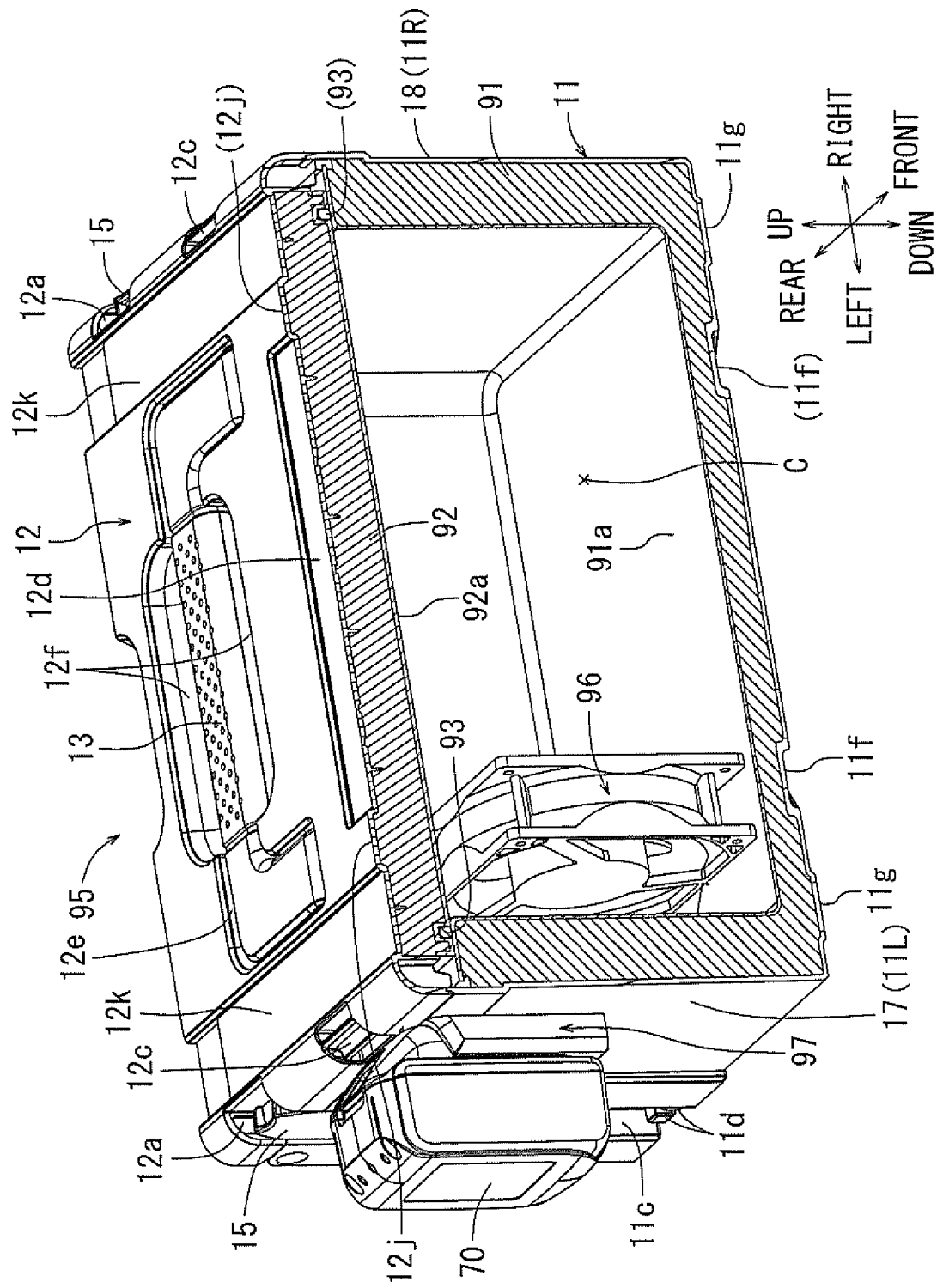
FIG. 17 is a vertical cross section of a stackable case according to another embodiment (fifth embodiment).

FIG. 17 shows a stackable case 95 according to a fifth embodiment, which differs from the fourth embodiment in that it includes a circulation fan 96 supported within the case main body 11. A battery-mounting portion (cradle) 97 may be arranged on (inside or outside) the left side of the case main body 11. A single battery pack 70 may be mounted on this battery-mounting portion 97 and may serve as a power source to supply power to the circulation fan 96.

According to the stackable case 95 of the fifth embodiment, the interior of the storage compartment C can be cooled more rapidly by placing an ice pack, freezable gel pack or other portable cooling device in the storage compartment C and using the circulation fan 96 to blow (circulate) air across the ice pack, etc. Similarly, the interior of the storage compartment C can be heated up more rapidly by placing a hot pack or other portable heating device in the storage compartment C and using the circulation fan 96 to blow (circulate) air across the hot pack, etc. In addition or in the alternative, the interior of the case main body 11 may be maintained hot or cold, as desired, for a longer period of time by the detecting temperature within the case main body 11 using a temperature sensor and appropriately switching the circulation fan 96 ON/OFF. Similar to the preceding embodiments, one or more battery packs designed for an electric power tool may be stored in the stacked tool case 20 or the power supply device 60 and used as the battery pack(s) 70 for supplying power to the circulation fan 96.

Figure 19:
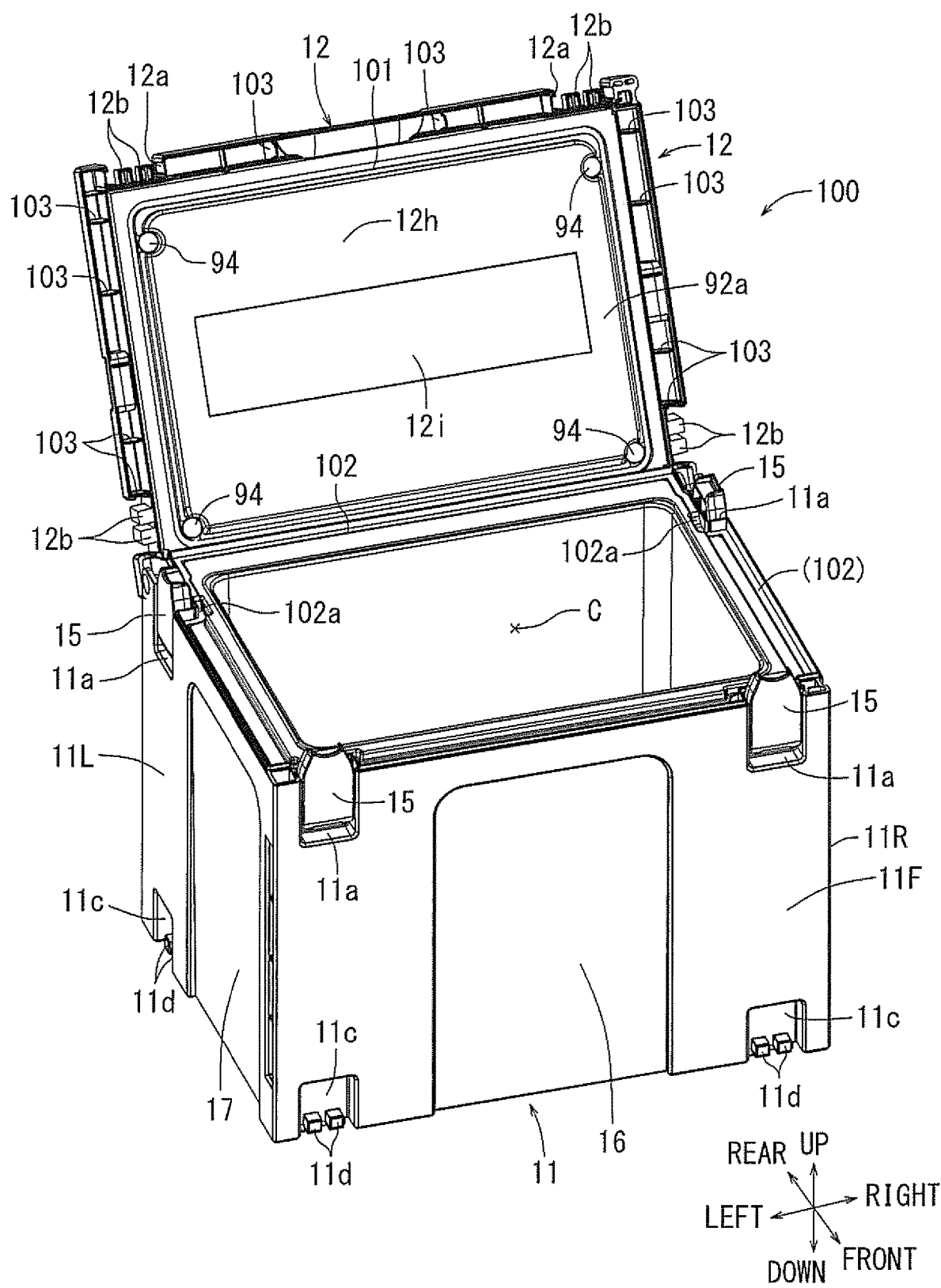
FIG. 19 is an overall perspective view of a stackable case according to another embodiment (sixth embodiment) with its lid opened.
Figure 20:
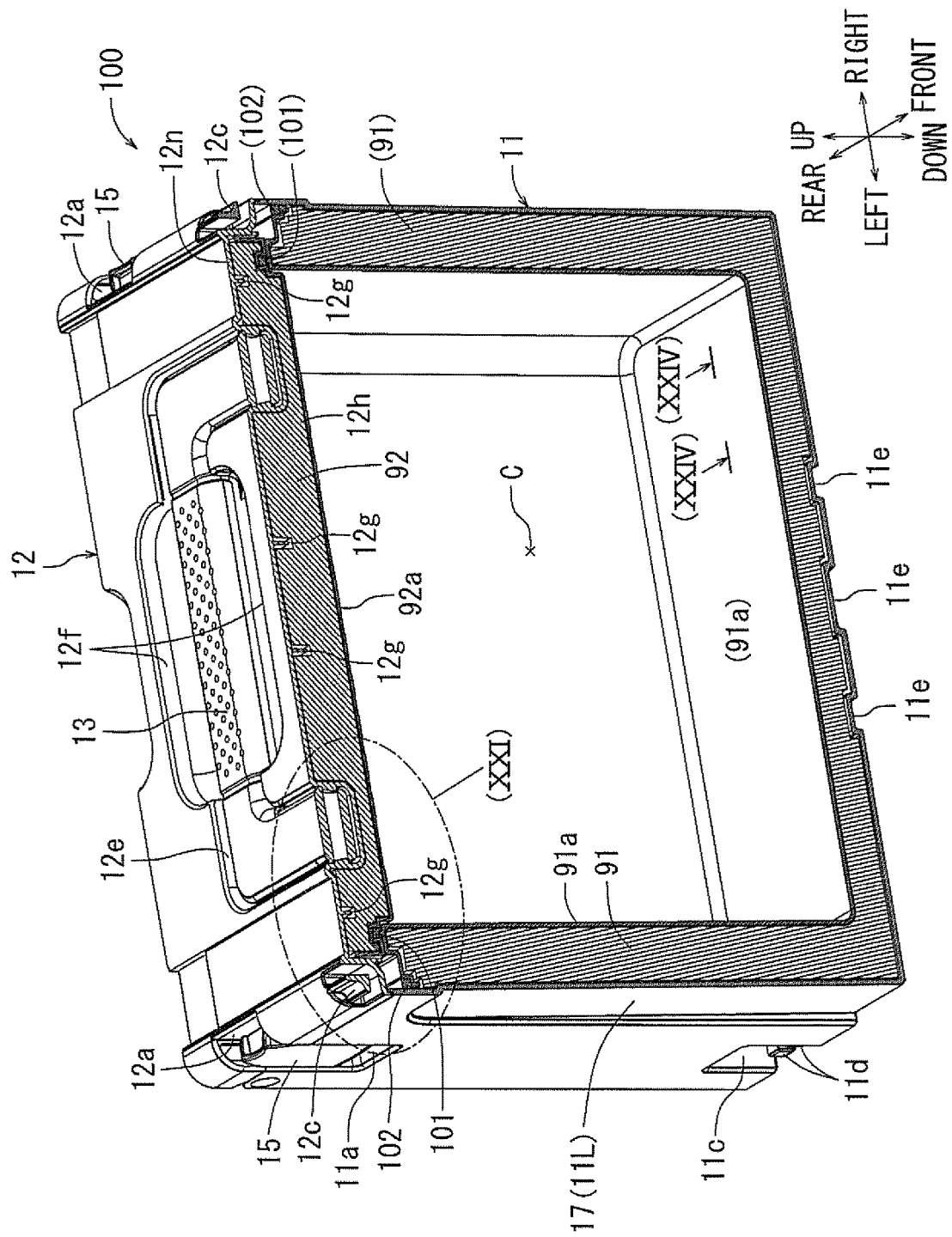
FIG. 20 is a vertical cross section of the stackable case according to the sixth embodiment with its lid closed.
Figure 25:
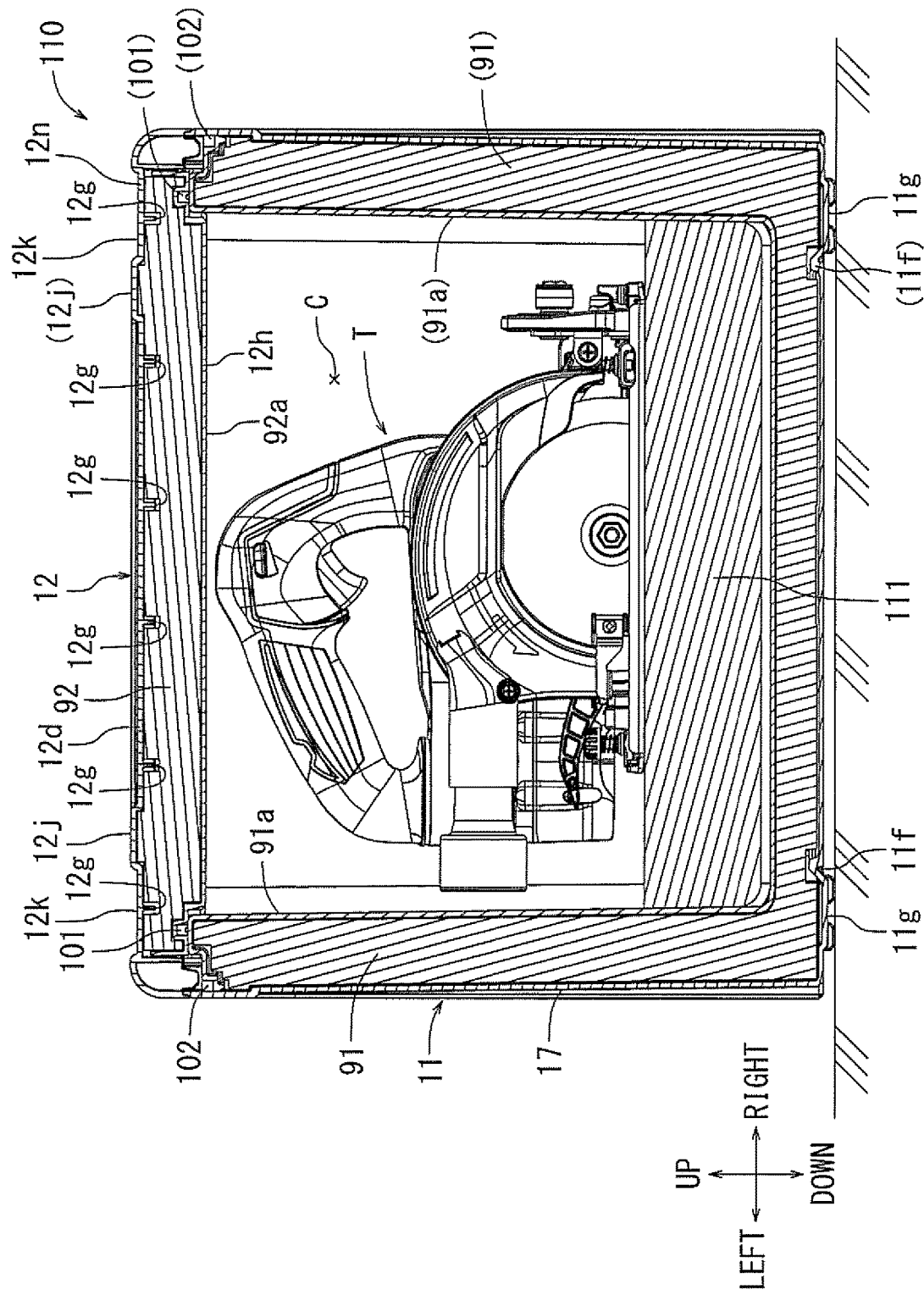
FIG. 25 is a vertical cross section of a stackable case according to another embodiment (seventh embodiment), showing an electric power tool stored in the stackable case.

FIGS. 19 and 20 show a stackable case 100 according to a sixth embodiment, and FIG. 25 shows a stackable case 110 according to a seventh embodiment. The stackable cases 100, 110 according to the sixth and seventh embodiments may be configured to have improved sealing properties of the lid 12 as compared to the stackable cases 90, 95 of the fourth and fifth embodiments. Hereinafter, only the modified components (structural elements) of the stackable cases 90, 95 according to the fourth and the fifth embodiments will be described. The same reference numerals will be used for the same components and configurations and will not be described further.

A stepped portion (protrusion, bulge) 12h may be formed on the inner panel 92a so as to cover or extend across substantially the entire inner surface of the lid 12 and to face the storage compartment C. The heat insulation material 92 (e.g., polystyrene foam, etc.) may be also arranged between the stepped portion 12h (inner panel 92a) and the outer panel 12n of the lid 12 without a gap. The stepped portion (protrusion, bulge) 12h is designed to be fitted into the upper opening of the storage compartment C such that the entire area of the opening of the storage compartment C is closed (covered, sealed) when the lid 12 is closed as shown in FIG. 20. Consequently, the sealing properties of the lid 12 may be further improved as compared to the stackable case 95 of the fifth embodiment, which does not include a bulged portion of the lid 12 that protrudes into the opening of the storage compartment C. As shown in FIG. 19, a logo display area 12i may be arranged in the middle of the stepped portion 12h for displaying a logo or other mark(s) of the manufacturer of the stackable case 100. The logo, mark(s), etc. may be formed on the logo display area 12i when the inner panel 92a is formed (molded) such that the logo, mark(s), etc. has an uneven height (bas relief and/or sunk relief, for example, 1 mm to 2 mm lower and/or higher than the surrounding area) and its corners may be at least substantially rounded. As a result, dirt, dust, etc. can not easily adhere to the logo, mark(s), etc. so that the interior of the storage compartment C can be maintained cleaner. Furthermore, since the logo, mark(s), etc, is (are) displayed on the inside of the lid 12, the user will see, for example, the name of manufacturer of the stackable case 100 when the lid 12 is opened. When the lid 12 is closed, the user may see the logo, mark(s), etc. in the logo display area 12d on the upper (outer) surface of the lid 12.

Figure 21:
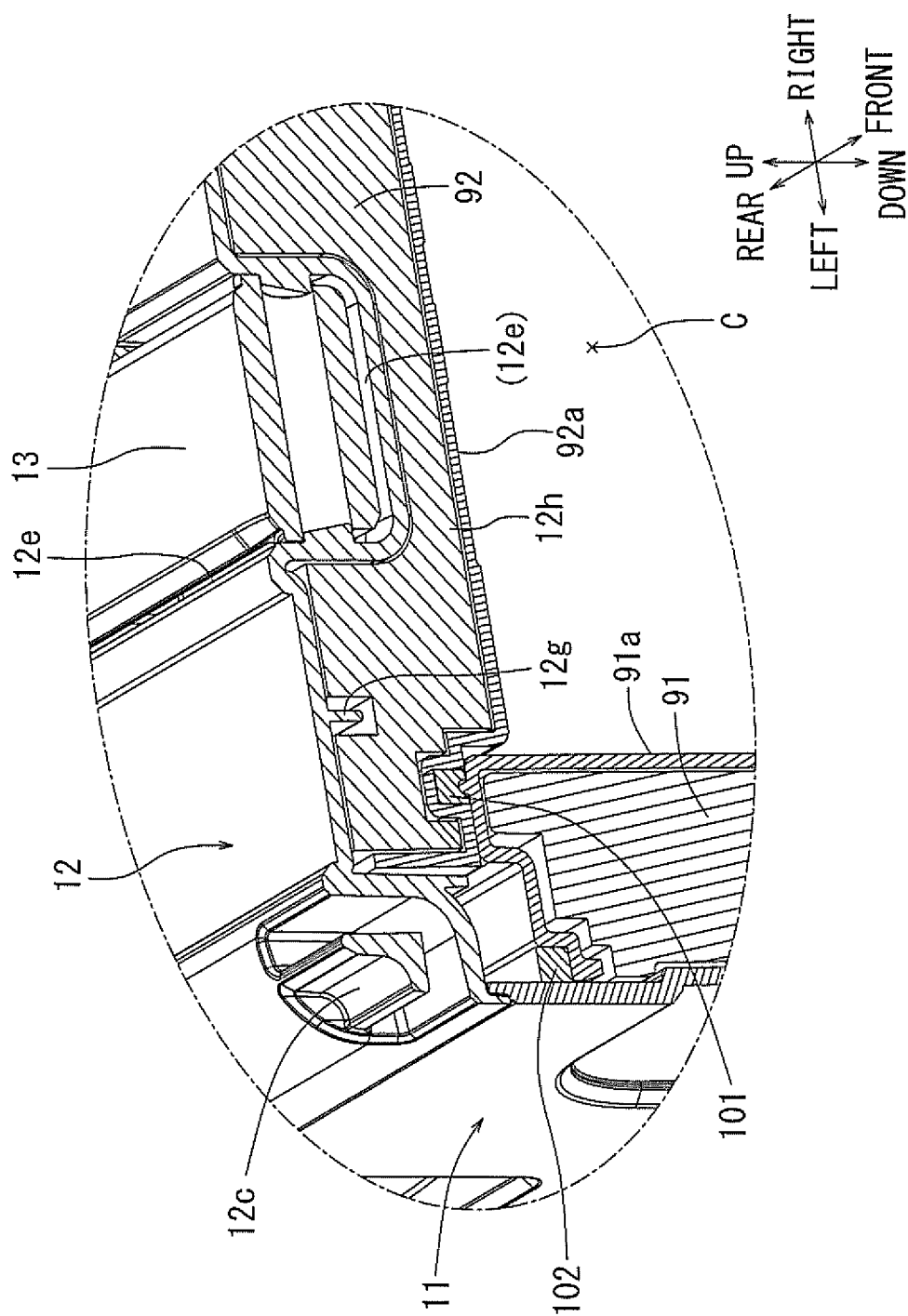
FIG. 21 is an enlarged view of a circled portion (XXI) of FIG. 20.
Figure 22:
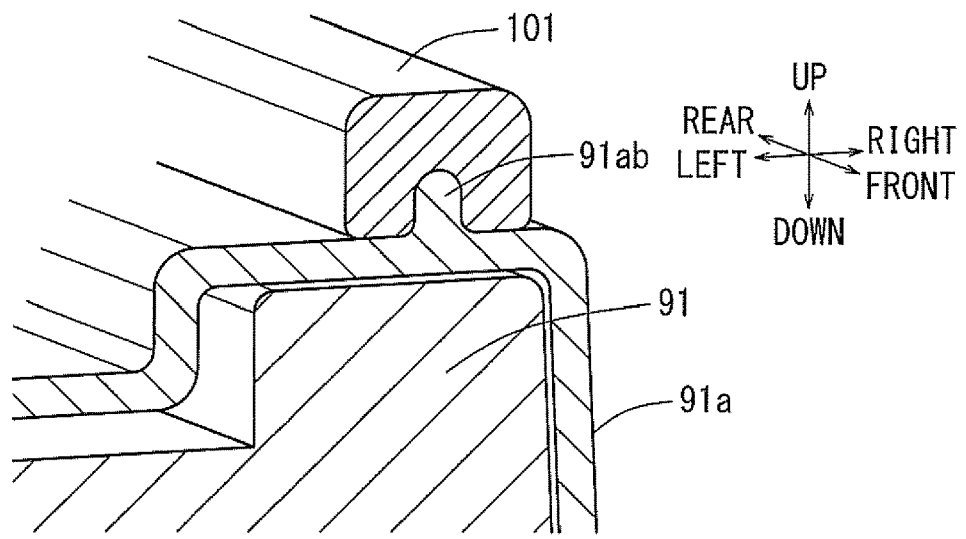
FIG. 22 is a vertical cross section of a gasket.

A gasket 101 having a rectangular cross section may be attached along the outer peripheral (circumferential) side of the stepped portion 12h. As shown in FIGS. 20 and 21, improved sealing properties (e.g., water-tightness and/or air-tightness) of the case main body 11 (storage compartment C) can be achieved by pressing the gasket 101 against the upper surface of the opening of the case main body 11 when the lid 12 is closed. As shown in FIG. 22, one or more engagement protrusions 91ab may be arranged on the upper surface of the opening of the case main body 11. The gasket 101 may be deformed into a forked or Y shape in cross section when the lid 12 is closed and the engagement protrusion(s) 91ab is (are) thereby pressed and sunk into the lower surface of the gasket 101. Consequently, a double seal is achieved that improves the sealing properties. The gasket 101 optionally may be modified according to the gasket 104 shown in FIG. 27, which already has a forked or Y shape in cross section. In such an embodiment, the engagement protrusion(s) 91ab of the embodiment shown in FIG. 22 can be omitted. Double sealing can also be achieved by the gasket 104 having the forked shape in cross section when the lid 12 is closed, so that the sealing properties with respect to the case main body 11 can be improved. Furthermore, instead of the gaskets 101, 104, which have a rectangular shape or a forked shape in cross section, respectively, a gasket having a circular shape in cross section may be used.

As shown in FIG. 21, the upper surface of the opening of the case main body 11 (upper surface of inner panel 91a) may be formed to have a stepped configuration in which the height of the upper surface in the up-down direction decreases in the direction towards the outside of the case main body 11. A seal or gasket 102 may be attached to the lowest, outermost peripheral (circumferential) portion of the upper surface of the opening of the case main body 11. The seal 102 may be attached along the entire periphery (circumference) of the rectangular upper surface of the opening. In other words, the seal 102 may be attached along the end edge of the inner panel 91a. Thus, the heat insulation material 91 may be waterproofed by sealing the gap between the end edge of the inner panel 91a and the case main body 11 (outer panel) with the seal 102.

Figure 23:
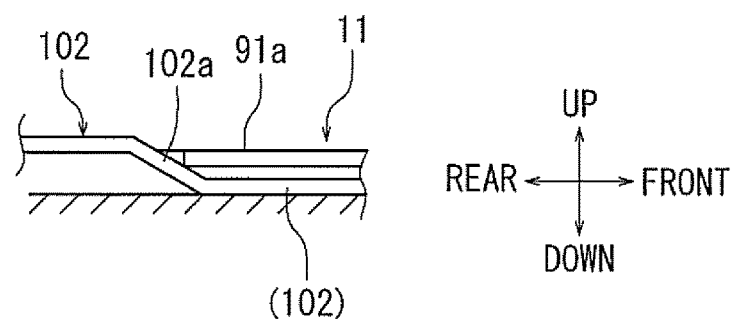
FIG. 23 is a side view of an inclined portion of a seal as seen from the left.

The seal 102 may be attached along the highest portion of the stepped structure on the rear side of the upper surface of the opening. On the other hand, the seal 102 may be attached along the lowest portion of the stepped structure on the left and right sides of the upper surface of the opening. Therefore, the seal 102 may be attached adjacent to the left and right latches 15 such that the attached height extends in an inclined manner along an incline 102a (see also FIG. 19) in a direction so as to extend downward toward the front as shown in FIG. 23.

A plurality of ribs 103 may be respectively arranged in front of and on the left and right sides of the lid 12 as shown in FIG. 19, such that, e.g., two ribs 103 are arranged in front, and four ribs 103 are respectively arranged on the left and right sides. When the lid 12 is closed, the plurality of the ribs 103 may be placed over (contact) the seal 102. Accordingly, the plurality of the ribs 103 serves to prevent the seal 102 from being pulled out in the upward direction, thereby improving the sealing properties (water-tightness along the end (upper edge) of the inner panel 91a) of the seal 102.

Figure 24:
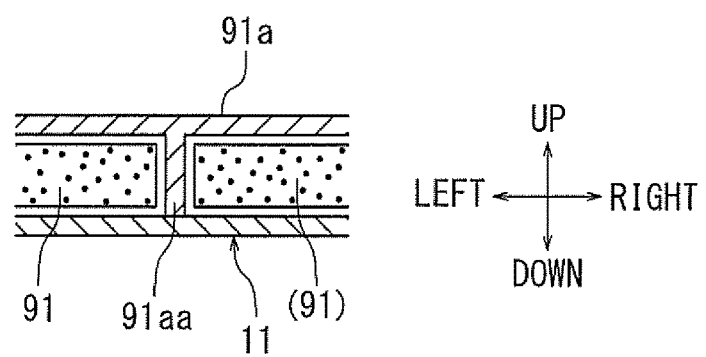
FIG. 24 is a cross-sectional view taken along line (XXIV)-(XXIV) of FIG. 20, showing a bottom portion of the case main body in a vertical cross section.

Furthermore, a countermeasure may be provided to prevent the heat insulation material 91 of the case main body 11 and/or the heat insulation material 92 of the lid 12 from deforming and/or displacing. As shown in FIG. 24, such a countermeasure may be one or more ribs 91aa arranged (defined) on the inner panel 91a of the case main body 11 at one or more locations. The ribs 91aa may be arranged on a bottom of the inner panel 91a as well as on the front, rear, left and right sides at a plurality of locations at appropriate intervals. Deformation and displacement of the heat insulation material 91 can be reliably prevented by these ribs 91aa, so that the heat insulating properties can be properly maintained. Similar ribs may be provided between the inner and outer panels 92a, 12n of the lid to prevent deformation and/or displacement of the heat insulation material 92.

As shown in, for example, FIG. 20, three recesses or depressions 11e may be formed on (in) the lower surface of the case main body 11 (i.e. the bottom panel thereof) so as to extend inward toward the heat insulation material 91. These three recesses 11e may be elongated grooves extending in the front-rear direction. The lower surface of the heat insulation material 91 may be form-fitted around each recess 11e, so that displacement of the heat insulation material 91 can be prevented and the heat insulating properties can be properly maintained. In addition, as shown in FIG. 16, three recesses 11e having the same configuration may also be provided on (in) the bottom surface (bottom panel) of the stackable case 90 of the fourth embodiment.

In addition or in the alternative, a loop-shaped recess (depression or groove) 11f, which extends inward toward of the insulation material 91, may be formed on (in) the lower surface (bottom panel) of the case main body 11, as shown in the stackable case 95 of the fifth embodiment illustrated in FIG. 17 and in the stackable case 110 of the seventh embodiment illustrated in FIG. 25. Displacement of the heat insulation material 91 also can be prevented by the loop-shaped recess 11f being form-fitted with the heat insulation material 91, so that the heat insulating properties can be properly maintained. Instead of the loop-shaped configuration as explained above, the recess 11f may be formed to have, for example, an X-shaped or an H-shaped configuration or a configuration that combines different geometries, such as a rectangular with four lines respectively radiating from the four corners of the rectangle to the four corners of the case main body 11.

As shown in FIG. 25, downwardly-extending left and right legs 11g may be arranged on the bottom surface of the stackable case 110 according to the seventh embodiment (or any of the preceding or subsequent embodiments). The left and right legs 11g may be elongated in the front-rear direction. The left and right legs 11g may be arranged on the outer peripheral (circumferential) side of the loop-shaped recess 11f. Furthermore, left and right channels 12k may be formed on (in) the upper surface of the lid 12 at positions that respectively correspond to the left and right legs 11g. Therefore, by placing the left and right legs 11g of one stackable case in the left and right channels 12k, respectively, of another stackable case, the two stackable cases can be stacked without forming a gap between the two stackable cases. Furthermore, the legs 11g and channels 12k also prevent lateral shifting of the two stacked cases relative to each other during transport thereof.

As described above, the handle storage recess 12e and the relief recesses 12f may be provided on (in) the upper surface of the lid 12 (outer panel 12n) for housing the carrying handle 13. The handle storage recess 12e and the relief recesses 12f may be oriented so as to protrude inward toward the heat insulation material 92. Thus, deformation and displacement of the heat insulation material 92 can be prevented by the heat insulation material 92 being form-fitted with both the handle storage recess 12e and the relief recesses 12f, so that the heat insulating properties can be properly maintained.

Further, as shown in FIGS. 20, 21 and 25, a plurality of ribs 12g extends toward (into) the heat insulation material 92 from the upper surface (outer panel 12n) of the lid 12 at a plurality of locations (four locations according to the present embodiment). Thus, deformation and displacement of the heat insulation material 92 can be prevented by the ribs 12g projecting into corresponding grooves formed in the heat insulation material 92, which also serves to maintain the heat insulating properties by preventing displacement of the heat insulating material 92.

As shown in FIG. 17 and FIG. 25, one or more steps (protrusions) 12j may be provided on the upper surface (outer panel 12n) of the lid 12 surrounding the logo display area 12d. The heat insulation material 92 may extend into the step(s) 12j without forming a gap therebetween.

Similar to the stackable case 90 of the fourth embodiment, the stackable cases 100 and 110 of the sixth and seventh embodiments may be configured such that the inner surface of the case main body 11 and the inner surface of the lid 12 are respectively covered with the heat insulation materials 91, 92 to serve as a heat transfer barrier. According to the stackable cases 100, 110 of the sixth and seventh embodiments, the heat insulation materials 91, 92 reduce heat flow (heat transfer), thereby maintaining the interior of the storage compartment C cooler or warmer for a longer period of time. Therefore, beverages, food, etc. can be stored in the stackable cases 100, 110 and carried while another case, for example, the power supply device 60 or the tool case 20, is connected (joined or linked) above or below in a stacked manner. In this regard, applicability (utility) of the stackable cases 100, 110 can be extended.

Furthermore, instead of beverages, food, etc. as described above, an electric power tool T may be housed and carried in the stackable case 110, as shown in FIG. 25. In FIG. 25, a portable circular saw is illustrated as a representative, non-limiting electric power tool T according to the present teachings. When the electric power tool T is housed as illustrated, a dedicated (form-fitting) storage base 111 may be installed in (inserted into) the case 110 in order to prevent the tool T from moving (shifting) and/or tipping over within the storage compartment C during transport. In this way, the stackable cases 100, 110 according to the sixth and seventh embodiments are multi-functional in that either beverages, food, etc. can be carried (while maintaining them warm or cold) together with another stacked case or an electric power tool T, its accessories, etc. can be housed and carried together with another stacked case.

Various modifications may be made to the above-described embodiments. For example, any of the stackable cases 10, 50, 80, which include a Peltier element 31, 55, may include a switch that changes the direction (polarity) of the current flow to the Peltier element 31, 55. In such embodiments, the contents of the storage compartment C may be selectively maintained warm or cold, as desired by the user, thereby extending the applicability and usage of the present teachings.

Furthermore, in the first and second embodiments, the power supply device 60 was placed below the stackable case 10, 50 and a tool case 20 is stacked on top of the stackable case 10, 50. However, this arrangement may be reversed, such the power supply device 60 is placed above and the tool case 20 is placed below the stackable case 10, 50 in the stacked arrangement.

Furthermore, in the third embodiment, the cooling device 51 was illustrated as being unitized (i.e. a single, integrated unit), and one battery pack 70 was mounted as its power source. However, such a unitized cooling device optionally may be powered by a plurality of battery packs.

Furthermore, it is noted that two or more of the stackable cases 10, 50, 80, 90, 95 may be carried together in a stacked manner, and some or all of the cases 10, 50, 80, 90, 95 are preferably designed to maintain the contents thereof cold and/or warm. In such an embodiment, the stackable cases 10, 50, 80, 90, 95 may be used as cases for conveniently carrying, for example, a greater amount or variety of items, such as fruit, frozen food, beverages, etc. in a cool or warm state. For example, one of the stacked cases may contain frozen food, which is kept at a lower temperature, one of the stacked cases may contain beverages, which are kept at a higher temperature than the frozen food but lower than the ambient temperature, and one of the stacked cases may contain hot food, which is kept at an even higher temperature, i.e. higher than ambient temperature.

Furthermore, in the first and second embodiments, the power supply device 60 is illustrated as a dedicated power source for supplying power to the cooling devices 30, 51. However, the power supply device 60 may also be used as a power source for an electric power tool or another electronic appliance that may be stored and carried within the stacked tool case 20.

In other embodiments, a separate charger may be disposed within the power supply device 60 for charging the battery packs 70, or the controller 64 may be further configured to perform a charging function. In such embodiments, for example, a commercial 110V or 220V power source may be connected via a power supply cord (37) as the power source for supplying power (current) to the charger, or a so-called cigarette lighter plug may be electrically connected to the power supply cord 37 in order to be able to connect the separate charger or the controller 64 of the power supply device 60 to a vehicle's 12V power supply. The latter embodiment provides the possibility that the charger and/or the controller 64 may be powered by the vehicle's 12V power supply while the stackable case and the power supply device 60 are being transported, thereby providing an alternative power supply to the Peltier element 31, 55, fans 33, 35, 96, etc. so that the battery pack(s) 70 need not be discharged. Similarly, if the power supply device 60, or possibly the stackable case 10, 50, 80 itself, is configured to input a commercial 100-240V AC power supply, the cooling device 30, 51, fans 33, 35, 96, etc., may be configured to be operated using power from the commercial power source when the stackable case is located in the vicinity of a commercial power source, thereby reducing the power demands (and the corresponding necessity for recharging) on the battery packs 70. An embodiment, in which the controller 64 is configured to charge the battery pack(s) 70, serves as another representative means for charging the battery pack according to the present teachings.

Furthermore, by providing a charging capability inside the power supply device 60, e.g., by providing a dedicated charger or by modifying the controller 64 to be able to recharge the battery packs 70 while they are stored in the power supply device 60, user convenience may be greatly improved, because such an embodiment eliminates the need to remove the battery packs 70 from the power supply device 60, e.g. at the end of a work day, to place them into chargers, and then to put the recharged battery packs 70 back into the power supply device 60 at the start of another work day. The power supply device 60 may be configured such that, when a controller detects that the power supply device 60 has been electrically connected to another power supply, e.g., a 100-240V commercial AC power source or a 12V vehicle power source, the power supply device 60 automatically checks the remaining charge level of each of the battery packs 70 stored therein and begins to perform a recharging operation, sequentially or in parallel, of any of the battery packs 70 in need of recharging. One or more fans optionally may be installed in the power supply device 60 to exhaust heat, which may be generated by the charging operation, from the interior of the power supply device 60. The dedicated charger or the controller 64 may be configured to also detect the temperature of the battery cells in the battery packs 70 in order to control the charging operation in a manner that avoids overheating the battery cells, as is known in the art.

Figure 28:
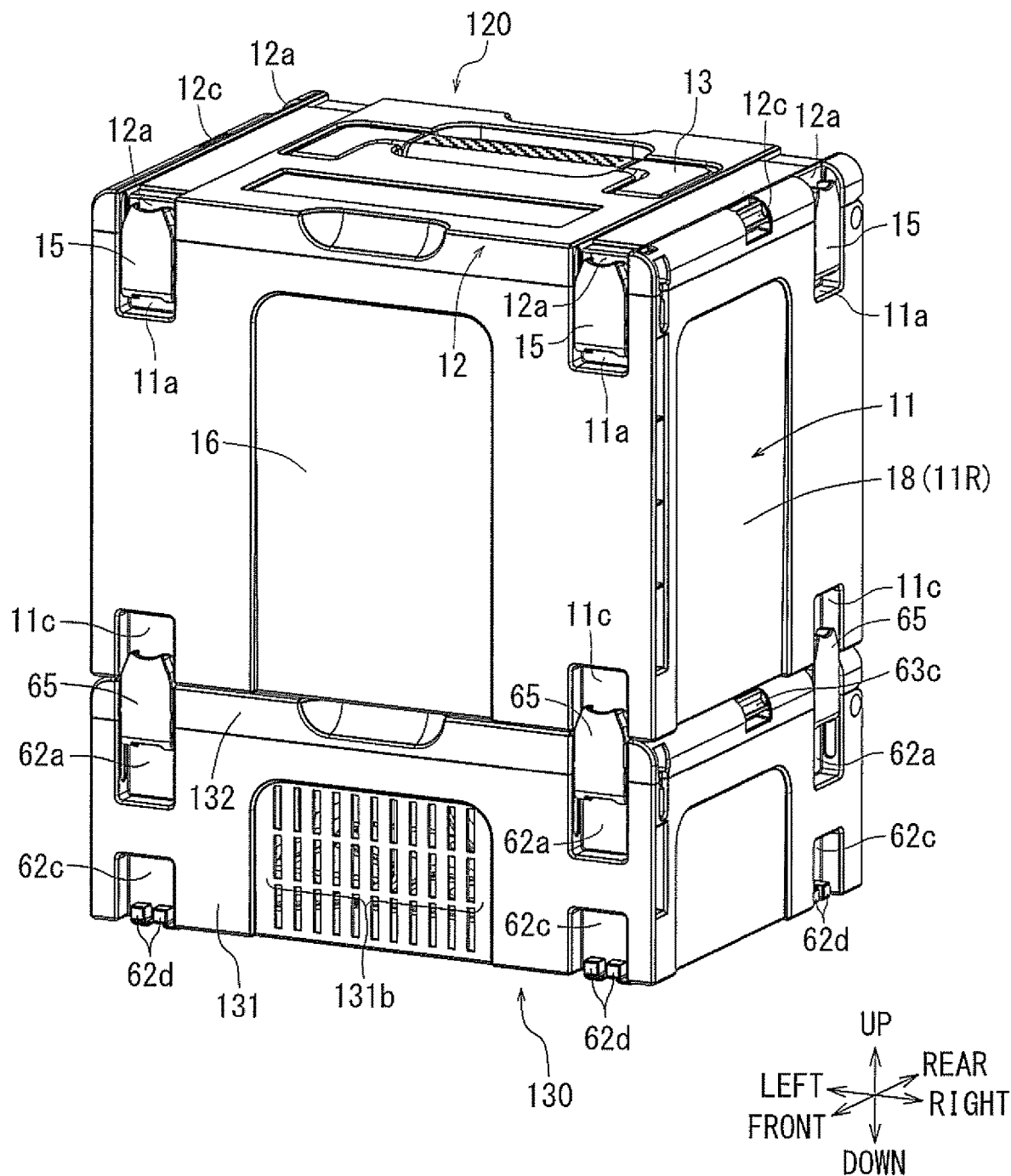
FIG. 28 is an overall perspective view of a stackable case and a stackable device according to another embodiment (eighth embodiment).
Figure 29:
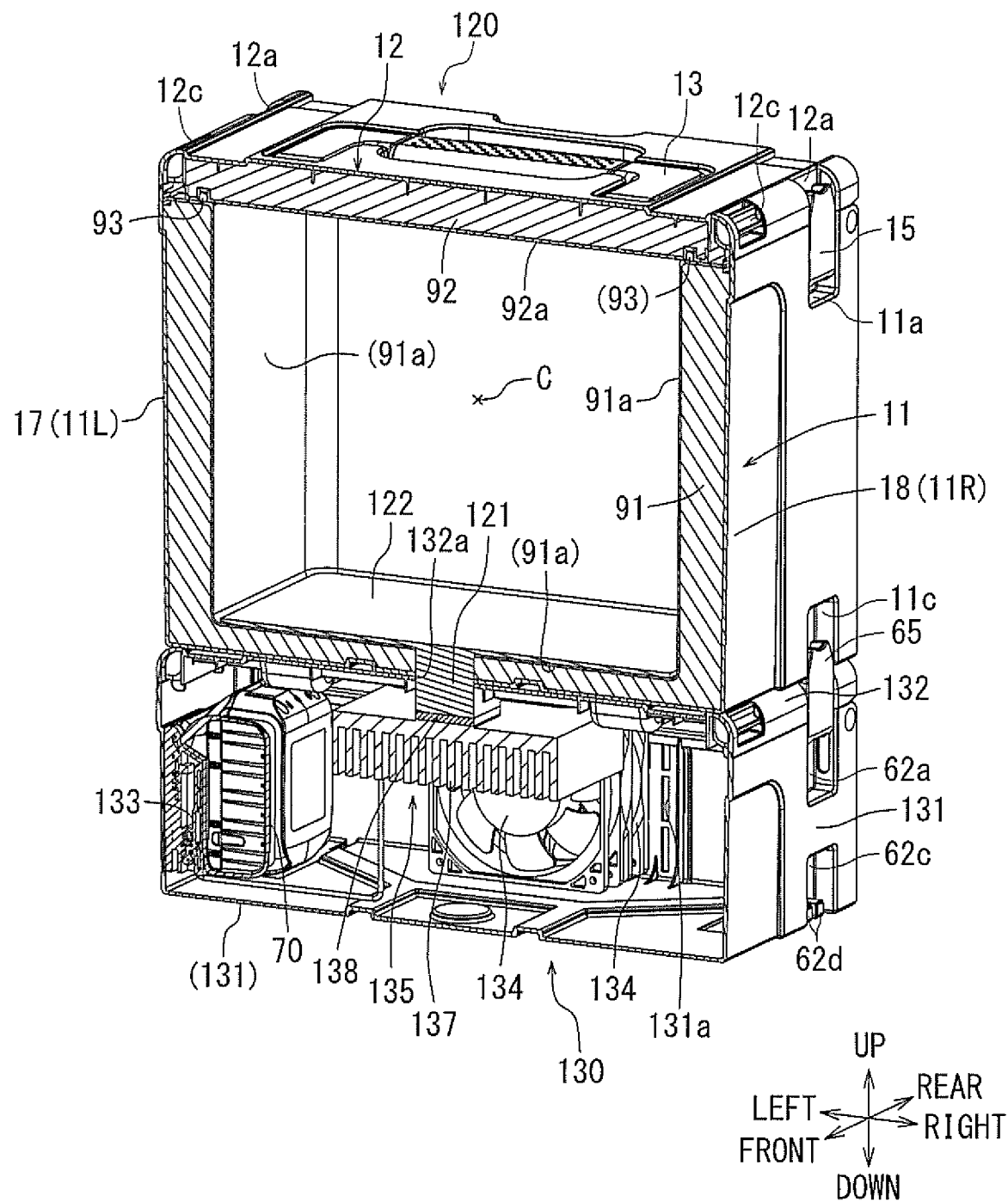
FIG. 29 is a perspective view of the stackable case and the stackable device according to the eighth embodiment in a vertical cross section.

FIGS. 28 and 29 show a stackable case 120 according to an eighth embodiment, which is a modification of the configurations of the first to third embodiments. Before describing this modification, it is first noted that the stackable case 10 of the first embodiment has an external cooling device 30 provided on a lateral side of the case main body 11, and this stackable case 10 may be placed either above or below the power supply device 60 in a stacked manner. The stackable case 50 of the second embodiment has an internal cooling device 51 located within the case main body 11, and it also may be placed above or below the power supply device 60 in a stacked manner. Finally, it is noted that the stackable case 80 of the third embodiment has an internal cooling device 51 and its power source (battery pack 70) is located within the second (functional) compartment K that is partitioned within the case main body 11.

However, in the modified stackable case 120 according to the eighth embodiment, a stackable cooling/heating device 130 is configured to be coupled (linked, connected) to the lower surface thereof in a stacked manner. The stackable case 120 of the eighth embodiment may be designed with the same (or substantially the same) heat or cold retention capabilities as the stackable case 90 of the fourth embodiment (i.e. it has no active cooling/heating device, such as a Peltier element). Therefore, descriptions of the structural elements and configurations in common with the preceding embodiments will be omitted by using the same reference numerals.

The stackable cooling/heating device 130, which is coupled (linked, joined) to the lower side of the stackable case 120 in a stacked manner, may include a case main body 131 and a lid 132, as shown in FIGS. 28 and 29. A battery pack 70 may be disposed within a case main body 131 as the power source for a cooling/heating device 135. Similar to the power supply case 61 of the power supply device 60 according to the first embodiment, the case main body 131 may have a shallower depth than that of the stackable case 120 and may be configured to have a rectangular box-shape. The stackable cooling/heating device 130 may be coupled to the lower side of the stackable case 120 with the lid 132 of the case main body 131 closed. Similar to all of the preceding embodiments, the lid 132 may be held closed and stackable cooling/heating device 130 may be coupled (linked) to the stackable case 120 by pressing the engagement recesses (not shown) of the four (interlocking) latches 65 of the stackable cooling/heating device 130 onto the corresponding connection protrusions 11d of the stackable case 120 to form a detachable engagement (link). The latches 65 may thus serve as a means for coupling (linking, joining, connecting) the stackable case 120 with the stackable cooling/heating device 130 in a stacked manner (stack-coupling means), in the same manner as the preceding embodiments.

As shown in FIG. 29, a slide-mounting-type battery-mounting portion (cradle) 133 may be arranged on the left side inner surface of the case main body 131. One battery pack 70 may be mounted on (in) this battery-mounting portion 133. The battery pack 70 can be mounted on (in) this battery-mounting portion 133 by sliding the battery pack 70 in the downward direction relative to the battery-mounting portion 133. The mounted battery pack 70 can be removed from the battery-mounting portion 133 by sliding the battery pack 70 in the upward direction.

Two circulating fans 134 may be coaxially attached to the rear side inner surface of the case main body 131. A plurality of exhaust ports 131a may be formed on the rear side of the case main body 131. Air within the case main body 131 may be discharged (exhausted) to the outside via the exhaust ports 131a by operating the circulating fans 134. Owing to the heat pumping capability of a Peltier element 138 disposed in the case main body 131, the air within the case main body 131 will be hotter than ambient air when the cooling/heating device 135 (Peltier element 138) is being operated to cool the storage compartment C and will be cooler than ambient air when the cooling/heating device 135 (Peltier element 138) is being operated to heat the storage compartment C. Furthermore, as shown in FIG. 28, a plurality of inlet ports 131b may be formed in the front side of the case main body 131. External air may be introduced (drawn) into the case main body 131 via the inlet ports 131b.

As shown in FIG. 29, a heat sink (thermal conductor) 137 may be mounted in the middle of the inner surface of the lid 132. The Peltier element 138 may be mounted in the middle of the upper surface of the heat sink 137. One side of the Peltier element 138 contacts the upper surface of the heat sink 137 and the other side thereof is oriented upward. Power may be supplied from the battery pack 70 to the Peltier element 138, such that the stackable cooling/heating device 130 of the eighth embodiment may serve as a cooling device or a heating device for the storage compartment C of the stackable case 120 depending upon the direction (polarity) of the current flow to the Peltier element 138. A rectangular insertion hole 132a may be formed in the middle of the lid 132 above the Peltier element 138.

As shown in FIG. 29, a heat conductor (thermal conductor) 121 projects downward from the middle of the lower surface of the stackable case 120. Thus, when the stackable case 120 is stacked on the upper side of the stackable cooling/heating device 130, this heat conductor 121 will project through the insertion hole 132a in the lid 131 and come into contact with the upper surface of the Peltier element 138. Due to this contact, heat can be effectively transmitted from the Peltier element 138 to the heat conductor 121 or vice versa, depending upon whether the Peltier device 138 is being operated as a heating device or a cooling device. The heat conductor 121 may be constructed as a thermally conductive metal block, such an iron block or a copper block, or if a weight reduction is preferable, an aluminum block or a magnesium block. Of course, alloys thereof are also possible.

The heat conductor 121 may be integrally formed, or attached in a thermally conducting manner, with the middle of the lower surface of a heat conducting panel 122 that lies on the bottom of the stackable case 120. The heat conducting panel 122 may be made, e.g., of a thermally conductive metal plate (e.g., an iron or copper plate, or if a weight reduction is preferable, aluminum or magnesium plate), and may have an area that extends over substantially the entire area of the bottom of the stackable case 120. The heat conducting panel 122 may be superimposed on the upper surface of the bottom inner panel 91a. The heat conductor 121 may pass through the bottom of the stackable case 120 so as to protrude downwardly from the lower surface of the stackable case 120. As was noted above, when the stackable case 120 is stacked on the upper side of the stackable cooling/heating device 130, the lowermost portion of the heat conductor 121 projects through the insertion hole 132a into the interior of the case main body 131 of the stackable cooling/heating device 130. As a result, the heat conductor 121 will come into contact with the upper surface of the Peltier element 138 when the interlocking latches 65 (stack-coupling means) are engaged with the connection protrusions 11d and the stackable cooling/heating device 130 is coupled (linked) to the stackable case 120 in a stacked manner.

Figure 30:
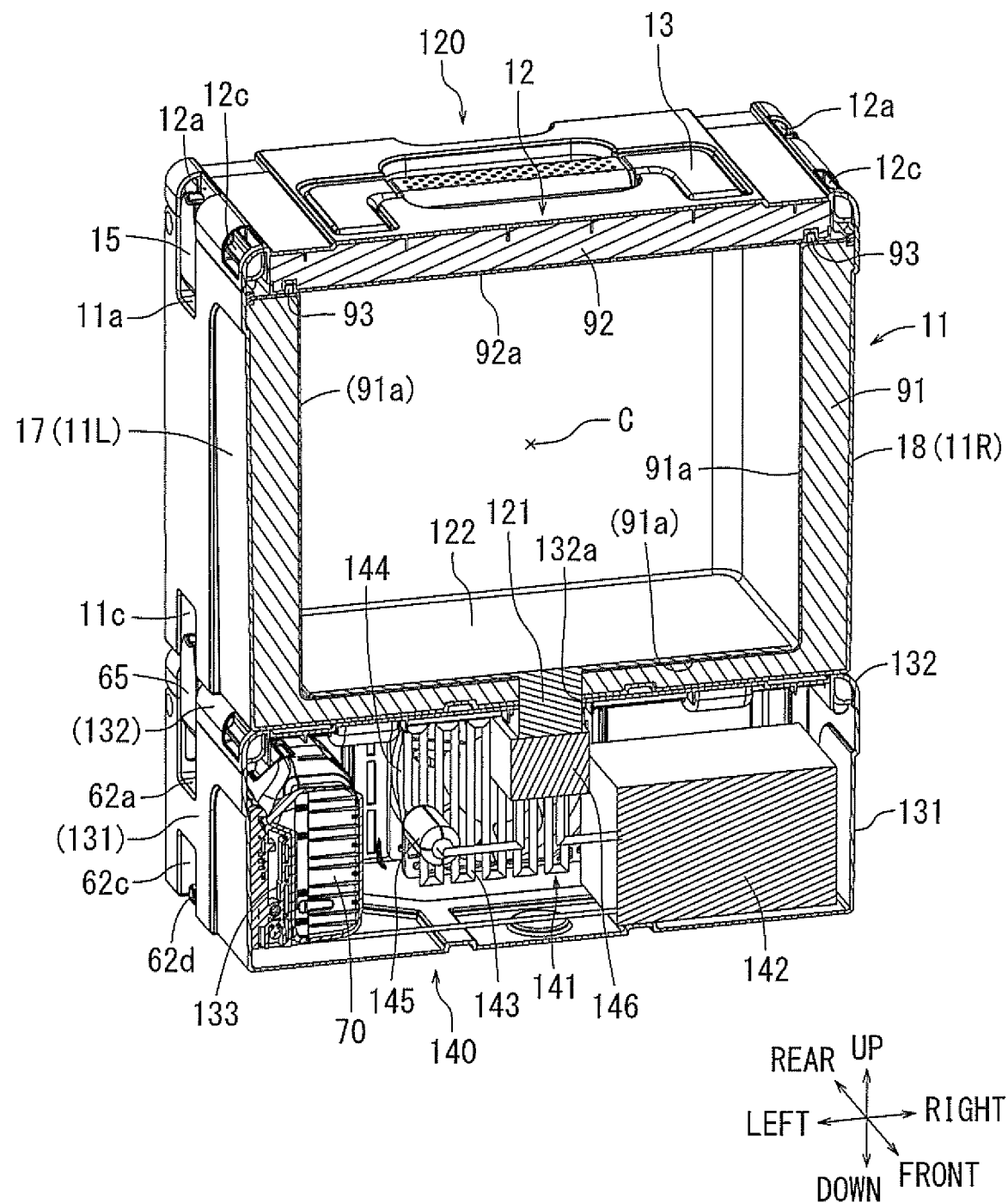
FIG. 30 is a perspective view of a stackable case and a stackable device according to another embodiment (ninth embodiment) in a vertical cross section.
Figure 31:
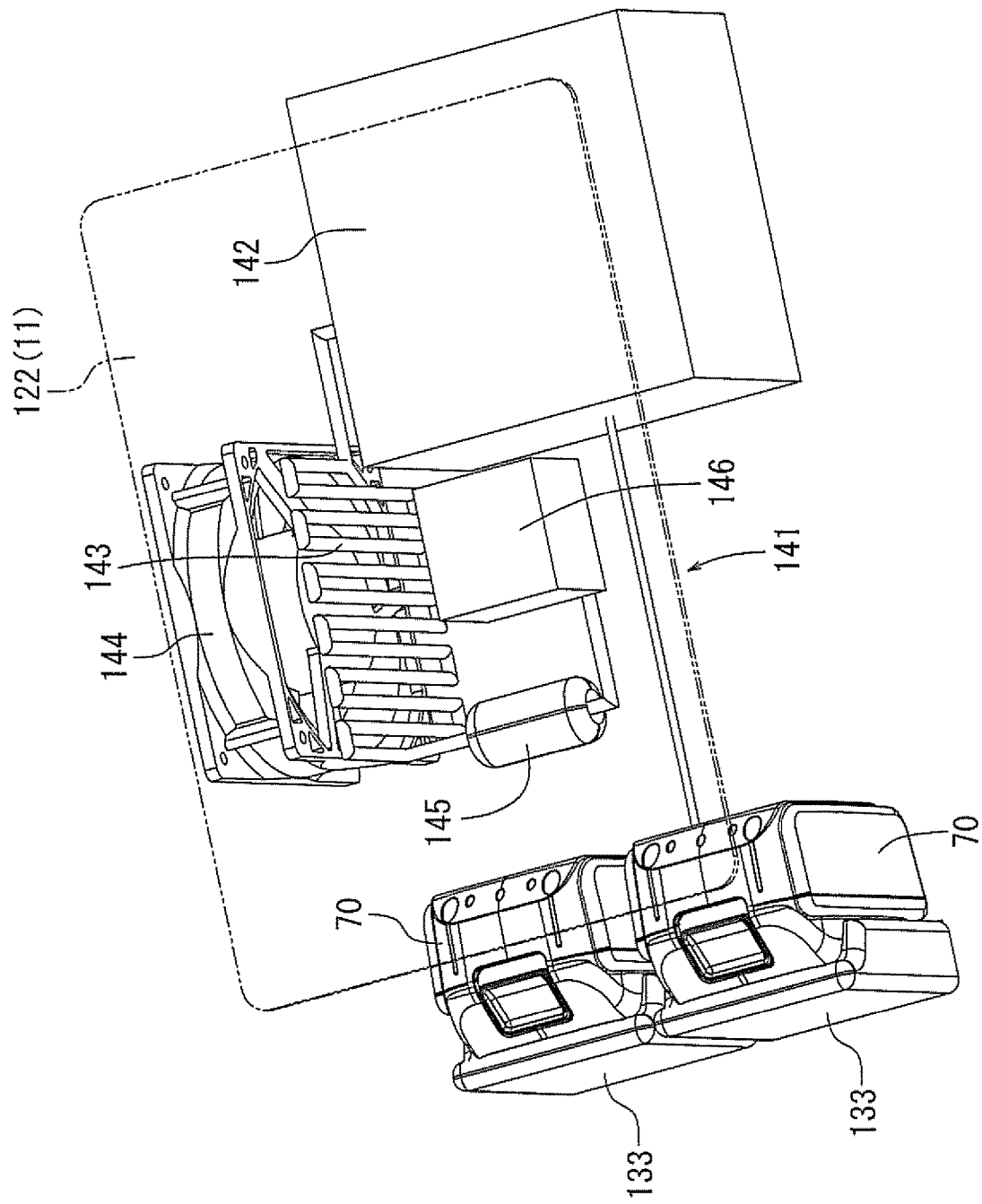
FIG. 31 is a perspective view showing the inner configuration of the stackable device according to the ninth embodiment.

FIGS. 30 and 31 show a stackable cooling device 140 according to a ninth embodiment, which is a modification of the stackable cooling/heating device 130 of the eighth embodiment. According to the ninth embodiment, the stackable case 120, which will be coupled to the upper side of the stackable cooling device 140 in a stacked manner, may have the same configuration as the stackable case 120 of the eighth embodiment. Therefore, descriptions of the structural elements and configurations in common with the preceding embodiments will be omitted by using the same reference numerals. The stackable cooling device 140 may include a shallow-bottomed rectangular case main body 131 and the lid 132.

Two vertical slide-mounting-type battery mounting portions (cradles) 133 may be arranged side by side inside the left side portion of the case main body 131. Two battery packs 70 may be respectively mounted on (in) the two battery-mounting portions 133. A cooling device 141 of the fourth embodiment, which is arranged within the case main body 131, may include a compressor 142, a condenser (heat radiation device) 143, a cooling fan 144, a pressure reduction valve (expansion valve) 145 and a cooling block (evaporator) 146.

In the ninth embodiment, such a vapor-compression refrigeration system may be used, instead of the Peltier element 138, as the cooling device 141. When the compressor 142 is driven using power supplied from the battery pack(s) 70, the cooling block 146 is cooled by the expansion of a refrigerant that is circulated from the compressor 142 via the condenser 143 and the pressure reduction valve 145.

As shown in FIG. 30, the downward side of the heat conductor 121 comes into contact with the upper surface of the cooling block 146 when the stackable case 120 is coupled to the upper surface side of the stackable cooling device 140 in a stacked manner. When the cooling block 146 is cooled as the cooling device 141 is driven, the heat conductor 121 and the heat conducting panel 122 are cooled, thereby absorbing heat from the storage compartment C within the stackable case 120 and thus cooling the storage compartment C.

According to the stackable devices 130, 140 of the eighth and ninth embodiments as configured above, the battery pack(s) 70 (power source) and the cooling devices 135, 141 may be housed within one case main body 131 that serves as one unit. Therefore, the storage compartment C of the stackable case 120 may have a relatively large volume.

The stackable case 120 according to the eighth and ninth embodiments may be used as a cooler with high heat insulation capacity similar to the stackable case 90 of the fourth embodiment when used alone, i.e., when not coupled to the stackable devices 130, 140. On the other hand, when one of the stackable devices 130, 140 is coupled to the lower surface side of the stackable case 120 in a stacked manner, the interior (volume) of the stackable case 120 (storage compartment C) is forcibly cooled or kept cool by the cooling device 135 having the Peltier element 138 or by the cooling device 141.

Furthermore, it is noted that the stackable devices 130, 140 according to the eighth or ninth embodiment can be obtained, e.g., by adding the heat conducting panel 122 and heat conductor 121 to a known stackable case, which means highly versatile, and low cost cases can be easily prepared. Optionally, the stackable devices 130, 140 according to the eighth or ninth embodiment may be modified to include resistive wires, e.g., in, on or in thermal communication with the heat conducting panel 122. Current from the battery pack(s) 70 may be supplied to the resistive wires in order to heat (warm) the interior (storage compartment C) of the stackable devices 130, 140.

Figure 32:
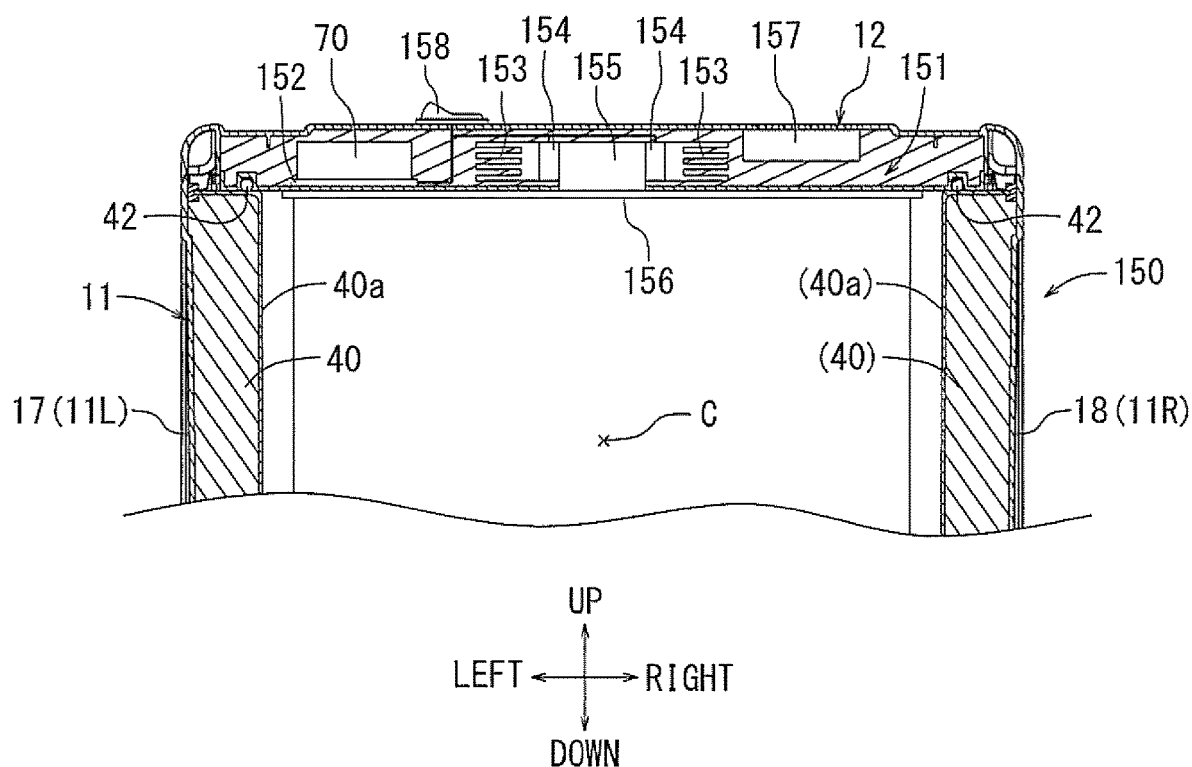
FIG. 32 is a vertical cross section showing the inner configuration of a stackable device according to another embodiment (tenth embodiment).

The above-illustrated eighth and ninth embodiments illustrate configurations in which the cooling devices 135, 141 and the battery mounting portion(s) 133 are housed in the stackable devices 130, 140 to form one unit that is separate (detachable) from the stackable case 120. On the other hand, the above first to seventh embodiments illustrate configurations in which the cooling devices 30, 51 and the battery mounting portions 81, 97 are arranged outside or inside the case main body 11. However, the cooling devices and the battery mounting portion(s) may instead be arranged within the lid 12 or on top of the lid 12. In this regard, FIG. 32 shows a stackable case 150 according to a tenth embodiment, in which a Peltier element and a battery mounting portion for mounting a battery pack 70 as the power source for the Peltier element may be housed within the lid 12 of a stackable case (10, 50, 80, 90, 95, 100, 110, 120, 150).

More specifically, the stackable case 150 according to the tenth embodiment may include the case main body 11 and the lid 12. The case main body 11 may have a similar or the same configuration as each of the preceding embodiments. Therefore, descriptions of the structural element and configurations in common with the preceding embodiments are omitted by using the same reference numerals. The stackable case 150 according to the tenth embodiment may also include the interlocking latches 15 as the above-explained stack-coupling means, which are not shown in FIG. 32. Therefore, another stackable case (tool case or cooler) can be coupled (linked) to the upper side or the lower side of the stackable case 150 in a stacked manner.

A cooling device 151 and a battery-mounting portion 152 may be housed within the inner space of the lid 12 instead of, or in addition to, the above-illustrated heat insulation material 41. The cooling device 151 may include a heat conducting panel 156 attached to the inner surface of the lid 12 and a heat conductor 155 formed integrally in the middle of the upper surface of the heat conducting panel 156. First and second Peltier elements 154 may be mounted on the left side and the right side of the heat conductor 155, respectively. A first side of each of the Peltier elements 154 contacts the lateral surfaces of the heat conductor 155. Fins 153 may be coupled to or formed on the second side of each of the Peltier elements 154.

The battery pack 70 may be mounted on (in) the battery-mounting portion 152 arranged within the lid 12. A switch 158 may be provided on the upper surface of the lid 12. Power from the battery pack 70 may be supplied to the Peltier elements 154 when the switch 158 is turned ON, e.g., to cool the heat conductor 155. The heat conducting panel 156 will thereby be cooled as the heat conductor 155 is cooled such that the heat conducting panel 156 absorbs heat from the storage compartment C of the case main body 11; as a result, the storage compartment C will be cooled. When the switch 158 is turned OFF, the supply of power to the Peltier elements 154 is shut off. As a result, the Peltier elements 154 will no longer cool the heat conductor 155 and the heat conduction panel 156. However, a fan 157 may continue to operate for a short time thereafter in order to circulate (blow) air across the fins 153 and thereby out of the lid 12, in particular to safely cool the Peltier elements 154 and fins 153 when the cooling device 151 has been operated to cool the storage compartment C of the stackable case 150.

In the stackable case 150 according to the tenth embodiment as configured above, the capacity (internal volume) of the storage compartment C of the case main body 11 can be increased since the cooling device 151 and the battery-mounting portion 152 are installed within the lid 12. Furthermore, a projection or protrusion in the storage compartment C can be eliminated, so that a simple interior appearance can be achieved. Furthermore, the lid 12 having the cooling device 151 and the battery mounting portion 152 arranged inside may be designed to be separated from the case main body 11 so as to allow the lid 12 to be attached to another case main body, i.e., to allow the lid 12 to be used with various other cases and/or to be attached afterward. In such an embodiment, case main bodies of various sizes in height may be allowed to be used as a cooler or a warmer by using the same lid 12. As a result, this design provides further added value for the stackable case.

It is noted that, as a modification of the above-described tenth embodiment, it is also possible to arrange (dispose) only the cooling device 151 within the lid 12. In such an embodiment, for example the power supply device 60 of the first embodiment may be coupled to the upper side or the lower side of the stackable case 150 in a stacked manner. In this way, the weight of the lid 12 can be reduced and sufficient power can be supplied to the cooling device 151 by the power supply device 60.

Furthermore, the stackable case 150 may be designed such that it can be used as a cooler or as a warmer by switching the direction (polarity) of the current flow to the Peltier elements 154, in the manner that was described in more detail above.

Figure 14:
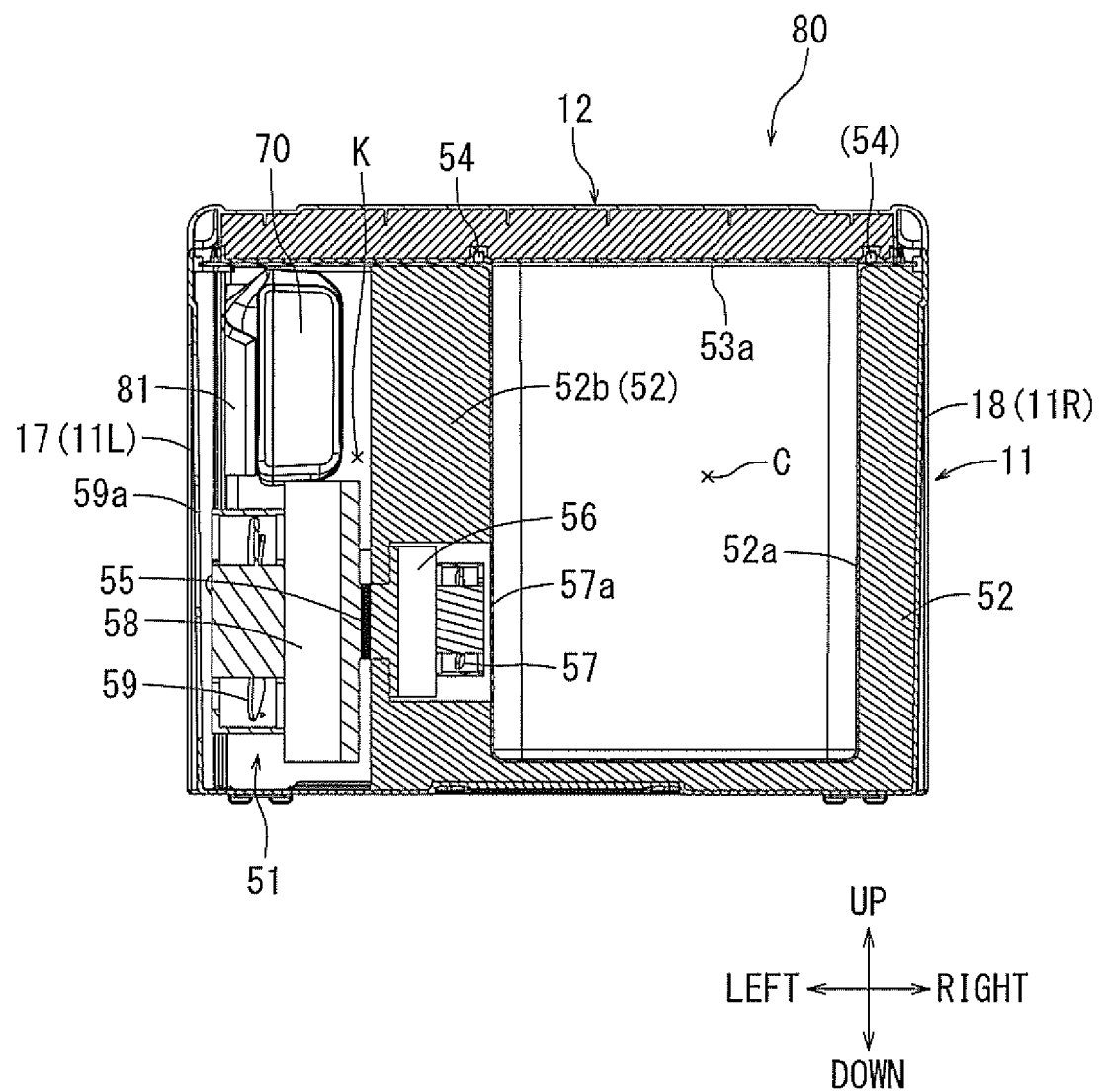
FIG. 14 is a vertical cross section of a stackable case according to another embodiment (third embodiment) in a vertical cross section.

In the embodiments shown in FIGS. 14 and 17, the battery pack 70 is disposed on or in the stackable case 80, 95, respectively. Such embodiments may be modified to incorporate a charger for the battery pack 70 either on the exterior of, or within the interior of, the stackable case 80, 95.

In the embodiments shown in FIGS. 28-31, the battery pack(s) 70 is (are) disposed on or in the stackable device 130, 140, respectively. Such embodiments also may be modified to incorporate a charger for the battery pack(s) 70 either on the exterior of, or within the interior of, the stackable device 130, 140.

In the embodiment shown in FIG. 32, the battery pack 70 is disposed in the lid 12 of the stackable case 150. Such an embodiment also may be modified to incorporate a charger for the battery pack 70 either on the exterior of, or within the interior of, the lid of the stackable case 150.

For example, in any of the above-noted embodiments, a dedicated charging circuit may be provided, or a controller that controls the operation of the Peltier element or fan may be modified to be capable of performing a battery charging function.

In any of the first to tenth embodiments or the modifications thereof described above, in which the stackable case, the stackable device, the power supply device or the lid is provided with a dedicated charger or a controller thereof is configured to perform a battery charging function, a power cord may be provided to electrically connect the dedicated charger and/or controller to a commercial AC power source or to an AC power generator (e.g., 100-240V), in order to connect to such an AC power source and charge the battery pack(s) thereby and/or to supply power to the Peltier element(s) and/or fan(s) when such an AC power source is available.

Of course, the power cord could, in addition or in the alternative, be configured to connect to a DC power source, such as e.g., a vehicle 12V power source (so that power can be supplied to the stackable case, the stackable device, the power supply device or the lid while it is being transported) or to a DC power generator, which may be, e.g., provided at a work site.

In any embodiments comprising a dedicated charger and/or a controller configured to perform a battery charging function, the battery pack(s) may be charged according to known charging algorithms, and the present teachings are not particularly limited in this regard. For example, and without limitation, a representative charging algorithm according to the present teachings may preferably include, e.g., detecting the charge level (voltage level) of one or more battery cells in the battery pack(s), e.g., using a voltage detecting circuit, comparing the detected charge level to a predetermined voltage threshold (e.g., corresponding to a fully charged state of the battery pack), supplying current to the one or more battery cells when the detected charge level is less than the predetermined voltage threshold, and stopping the supply of current to the one or more battery cells when the detected charge level equals or exceeds the predetermined voltage threshold.

Optionally, the temperature of one or more of the battery cells may be detected during the charging operation, e.g., using a temperature sensor, and the charging algorithm may include a step that determine the amount of current that is supplied to the one or more battery cells based in part upon the detected battery temperature.

For example and without limitation, if the detected battery temperature equals or exceeds a predetermined temperature threshold, the current supplied to the battery pack may be reduced or cut off, in order to prevent damage to the battery pack caused by overheating.

All of the above-described embodiments serve as additional representative means for charging the battery pack according to the present teachings.

Depending on design requirements, exemplary embodiments of the controller 38, the control circuit 38*b*, the controller 64 and/or the dedicated charger of the present disclosure (or any other controller utilized in the present teachings) may be implemented in hardware and/or in software. The controller 38, the control circuit 38*b*, the controller 64 and/or the dedicated charger can be configured using a digital storage medium, for example one or more of a ROM, a PROM, an EPROM, an EEPROM, a flash memory, etc., on which electronically readable control signals (program code-instructions) are stored, which interact or can interact with one or more programmable hardware components to execute programmed functions.

The (each) programmable hardware component can be formed by a processor, a computer processor (CPU=central processing unit), an application-specific integrated circuit (ASIC), an integrated circuit (IC), a computer, a system-on-a-chip (SOC), a programmable logic element, and/or a field programmable gate array (FGPA). A microprocessor is a typical component of a controller according to the present teachings.

The digital storage medium can therefore be machine- or computer-readable. Some exemplary embodiments thus comprise a data carrier or non-transient computer readable medium which includes electronically readable control signals which are capable of interacting with a programmable computer system or a programmable hardware component such that one of the methods or functions described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the controller 38, the control circuit 38*b*, the controller 64 and/or the dedicated charger, are implemented as a program, firmware, computer program, or computer program product including a program, or as data, wherein the program code or the data is operative to perform one of the methods when the program runs on (is executed by) a processor or a programmable hardware component. The program code or the data can for example also be stored on a machine-readable carrier or data carrier, such as any of the types of digital storage media described above. The program code or the data can be, among other things, source code, machine code, bytecode or another intermediate code.

A program according to an exemplary embodiment can implement one of the methods or function during its performance, for example, such that the program reads storage locations and/or writes one or more data elements into these storage locations, wherein switching operations or other operations are induced in transistor structures, in amplifier structures, or in other electrical, electronic, optical, magnetic components, or components based on another functional or physical principle. Correspondingly, data, values, sensor values, or other program information can be captured, determined, or measured by reading a storage location. By reading one or more storage locations, a program can therefore capture, determine or measure sizes, values, variables, and other information, as well as cause, induce, or perform an action by writing in one or more storage locations, as well as control other apparatuses, machines, and components, and thus for example also perform any complex process that the evaluation unit according to the present teachings may be designed to perform.

Although some aspects of the present teachings have been described in the context of a device or apparatus, it is to be understood that these aspects also represent a description of a corresponding method, so that a block or a component of a device or apparatus is also understood as a corresponding method step or as a feature of a method step. In an analogous manner, aspects which have been described in the context of or as a method step also represent a description of a corresponding block or detail or feature of a corresponding device.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Additional embodiments disclosed herein include, but are not limited to:

1. A case comprising a heat insulation material such that the case houses an object to be stored in a cool-keeping state or in a warm-keeping state, wherein an electric power tool is housed in the case.

2. A stackable case comprising a latch configured to couple the stackable case to a tool case, in which an electric power tool is housed, in a stacked manner; and means for cooling or heating an interior of the stackable case.

3. The stackable case according to embodiment 2, wherein the means for cooling or heating the interior of the stackable case comprises a Peltier element.

4. The stackable case according to embodiment 2 or 3, further comprising a rechargeable battery pack configured to serve as a power source for the electric power tool, the rechargeable battery pack being electrically connected to the Peltier element (means for cooling or heating).

5. The stackable case according to any one of embodiments 2-4, further comprising a fin and a fan disposed proximal to the Peltier element (means for cooling or heating).

6. The stackable case according to any one of embodiments 2-5, wherein the Peltier element (means for cooling or heating), the battery pack, the fin, and the fan are disposed in the interior of the stackable case or are attached to a lateral side of the stackable case.

7. A case set, comprising the stackable case according to any one of embodiments 2-6, and a power supply device detachably joined to the stackable case in a stacked manner, the power supply device containing a plurality of rechargeable battery packs configured to serve as a power supply for the electric power tool, the plurality of rechargeable battery packs being electrically connected to the Peltier element (means for cooling or heating).

8. A stackable device configured to be detachably joined to a stackable case in a stacked manner, the stackable device comprising:
means for cooling and/or heating an interior of the stackable case; and
means for detachably joining the stackable device to the stackable case or to a tool case, in which an electric power tool is housed, in a stacked manner.

9. The stackable device according to embodiment 8, wherein the means for cooling and/or heating the interior of the stackable case comprises a Peltier element.

10. The stackable device according to embodiment 8 or 9, further comprising a rechargeable battery pack configured to serve as a power source for the electric power tool, the rechargeable battery pack being electrically connected to the Peltier element (means for cooling or heating).

11. The stackable device according to any one of embodiments 8-10, wherein the means for detachably joining includes a latch configured to engage with and detachably join to the stackable case such that the stackable case is disposed above the stackable device.

12. A stackable case comprising:
first means for detachably joining to a tool case, in which an electric power tool is housed, in a stacked manner, wherein, second means for detachably joining to a stackable device having a means for cooling and/or heating an interior of the stackable case.

We claim:

1. A stackable case comprising:
a case main body having a hard plastic inner panel and a hard plastic outer panel, the inner panel defining a storage compartment for storing food and/or drink items,
a lid pivotably connected to the case main body via one or more hinges, and being pivotable relative to the case main body so as to open and close the storage compartment,
a heat insulation material disposed between the outer panel and the inner panel of the case main body and between a hard plastic outer panel and a hard plastic inner panel of the lid,
at least one interlocking latch disposed at an upper portion of the stackable case, and
a connection recess defined in a lower portion of the stackable case,
wherein:
at least one connection protrusion is located in the connection recess,
the at least one interlocking latch and the at least one connection recess are spaced apart in a vertical direction of the stackable case and are intersected by a vertical line, and
the at least one interlocking latch includes at least one engagement recess having a shape that is complementary to an outer contour of the at least one connection protrusion,
further comprising:
a means for cooling and/or heating the storage compartment; and
a battery pack electrically connected to the cooling and/or heating means and configured as a slide-mounting-type, rechargeable battery pack that is configured to also serve as a power source of a cordless electric driver drill.

2. The stackable case according to claim 1, wherein:
at least one fixing member fixes the inner panel of the lid to the outer panel of the lid.

3. The stackable case according to claim 2, wherein the at least one fixing member comprises a clip having a flat head that contacts one of the inner panel or the outer panel, a stem and at least one claw that engages an engagement hole formed in the other of the inner panel and the outer panel.

4. The stackable case according to claim 1, wherein:
at least one rib is disposed between the outer panel and the inner panel of the case main body such that the rib contacts both the outer panel and the inner panel of the case main body and maintains a spacing therebetween.

5. A case set comprising:
a first case in which an electric power tool can be housed, the first case having a connection recess containing at least one connection protrusion; and
the stackable case according to claim 1,
wherein the at least one interlocking latch of the stackable case according to claim 1 is elastically fitted onto and engaged with the at least one connection protrusion of the connection recess of the first case,
at least one part on the first case differs in color from other parts of the first case, and
at least one part on the stackable case according to claim 1 differs in color from other parts of the stackable case.

6. The stackable case according to claim 1, further comprising:
belt attachment pins disposed on left and right sides of the lid, and
a shoulder belt attached to the left and right belt attachment pins.

7. The stackable case according to claim 1, wherein:
an interior of the case main body is partitioned into the storage compartment and a second compartment, and
a battery-mounting portion configured to receive the battery pack is disposed within the second compartment, the battery-mounting portion including at least one rail configured to physically connect the battery pack to the battery-mounting portion and at least one connection terminal configured to electrically connect the battery pack to the means for cooling and/or heating.

8. The stackable case according to claim 1, wherein:
the cooling and/or heating means comprises a Peltier element electrically connected to the battery pack, and
a fan is disposed proximal to the Peltier element and is electrically connected to the battery pack.

9. The stackable case according to claim 8, further comprising:
a switch configured to change a direction of current flow to the Peltier element so as to selectively cool or warm the storage compartment.

10. The stackable case according to claim 8, wherein:
the Peltier element is housed within an inner space of the lid, and
a thermal conductor contacts the Peltier element and is housed within the inner space of the lid.

11. The stackable case according to claim 1, further comprising a means for charging the battery pack.

12. The stackable case according to claim 1, wherein:
the cooling and/or heating means comprises a compressor electrically connected to the battery pack.

13. The stackable case according to claim 1, wherein the heat insulation material is selected from the group consisting of polystyrene foam, fiberglass, polyethylene foam, cellulose and cotton.

14. The stackable case according to claim 13, wherein:
the lid has a top on an opposite side of the lid that faces the storage compartment,
a carrying handle is pivotably attached to the top of the lid and
a handle storage recess is defined in lid and is configured to accommodate the carrying handle so that the carrying handle is storable in a flush manner with the top of the lid.

15. The stackable case according to claim 14, further comprising:
projections formed on one of the top of the lid and bottom of case main body; and
grooves formed on the other of the top of the lid and the bottom of the case main body,
wherein the grooves are complementary to the projections so that projections of another case fit within the grooves.

16. A case set comprising:
the stackable case according to claim 1, and
a first case having a connection recess containing at least one connection protrusion,
wherein the at least one interlocking latch is configured to be elastically fitted onto and engaged with the at least one connection protrusion of the connection recess of the first case.

17. A case set comprising:
the stackable case according to claim 1, and
either
i) a first case having a connection recess containing at least one connection protrusion, the first case containing a power supply and a cooling/heating device, or
ii) a first case having a connection recess containing at least one connection protrusion, the first case containing a power supply including at least one rechargeable battery pack,
wherein the at least one interlocking latch is configured to be elastically fitted onto and engaged with the at least one connection protrusion of the connection recess of the first case.

\* \* \* \* \*